US010691112B2

(12) United States Patent
Katsunuma et al.

(10) Patent No.: US 10,691,112 B2
(45) Date of Patent: Jun. 23, 2020

(54) MANUFACTURING MANAGEMENT METHOD AND MANUFACTURING MANAGEMENT SYSTEM

(71) Applicant: Hitachi, Ltd., Chiyoda-ku, Tokyo (JP)

(72) Inventors: Satoshi Katsunuma, Tokyo (JP); Noriyuki Haga, Tokyo (JP); Yasuyuki Kudo, Tokyo (JP)

(73) Assignee: HITACHI, LTD., Tokyo (JP)

( * ) Notice: Subject to any disclaimer, the term of this patent is extended or adjusted under 35 U.S.C. 154(b) by 187 days.

(21) Appl. No.: 15/914,768

(22) Filed: Mar. 7, 2018

(65) Prior Publication Data

US 2018/0259942 A1 Sep. 13, 2018

(30) Foreign Application Priority Data

Mar. 8, 2017 (JP) .................................. 2017-044157

(51) Int. Cl.
*G05B 19/418* (2006.01)
*H04L 29/08* (2006.01)
*H04L 29/06* (2006.01)

(52) U.S. Cl.
CPC ..... *G05B 19/4183* (2013.01); *G05B 19/4185* (2013.01); *G05B 19/41875* (2013.01);
(Continued)

(58) Field of Classification Search
CPC ............ G05B 19/4183; G05B 19/4185; G05B 19/41875; G05B 2219/32196;
(Continued)

(56) References Cited

U.S. PATENT DOCUMENTS

2007/0005156 A1* 1/2007 Moinvaziri ........ G05B 19/4183
700/56
2012/0239179 A1* 9/2012 Hanawa ................. G06Q 10/06
700/109
(Continued)

FOREIGN PATENT DOCUMENTS

JP    2005-346614 A    12/2005
JP    2011-034234 A    2/2011
(Continued)

OTHER PUBLICATIONS

Office Action issued in Corresponding Japanese Patent Application No. 2017-044157 dated Jan. 28, 2020, with English translation.

*Primary Examiner* — Yuhui R Pan
(74) *Attorney, Agent, or Firm* — Foley & Lardner LLP

(57) ABSTRACT

Provided is an information processing apparatus performing: storing traceability information that is information which results from associating an apparatus that processes the component, an operating person who is in charge of the processing, and a timing at which the processing is performed, with each other; storing processing situation information that is information that results from associating a situation of the processing of the component and a timing at which the processing is performed, with each other; generating a combination at the same timing, of the processing, the apparatus or the operating person, and the situation of the processing, as an object integration data, based on the traceability information and the processing situation information; and outputting contents of the generated object integration data.

13 Claims, 30 Drawing Sheets

(52) U.S. Cl.
CPC ............ *H04L 67/12* (2013.01); *H04L 67/125* (2013.01); *H04L 67/42* (2013.01); *G05B 2219/32196* (2013.01); *Y02P 90/02* (2015.11); *Y02P 90/22* (2015.11); *Y02P 90/30* (2015.11)

(58) Field of Classification Search
CPC ....... H04L 67/12; H04L 67/125; H04L 67/42; Y02P 90/02; Y02P 90/22; Y02P 90/30
See application file for complete search history.

(56) References Cited

U.S. PATENT DOCUMENTS

| | | |
|---|---|---|
| 2014/0350708 A1 | 11/2014 | Kobayashi |
| 2018/0122157 A1 | 5/2018 | Tomoda |

FOREIGN PATENT DOCUMENTS

| | | | |
|---|---|---|---|
| JP | 2015-184724 A | 10/2015 | |
| WO | WO-2013/035687 A1 | 3/2013 | |
| WO | WO-2017/013899 A1 | 1/2017 | |

\* cited by examiner

FIG. 4

COMPONENT TRACEABILITY DATA

| POINT IN TIME | COMPONENT ID | APPARATUS ID | PROCESSING DETAIL |
|---|---|---|---|
| 9:00 TO 9:10 | COMPONENT β | APPARATUS 1 | TRANSPORTATION |
| 9:05 TO 9:15 | COMPONENT γ | APPARATUS 1 | PAINTING |

2081 — POINT IN TIME
2082 — COMPONENT ID
2083 — APPARATUS ID
2084 — PROCESSING DETAIL
208
404
405

FIG. 5

OPERATOR TRACEABILITY DATA

| POINT IN TIME | OPERATOR ID | APPARATUS ID |
|---|---|---|
| 9:00 TO 9:10 | OPERATOR C | APPARATUS 1 |

2091 — POINT IN TIME
2092 — OPERATOR ID
2093 — APPARATUS ID
209
503

FIG. 6

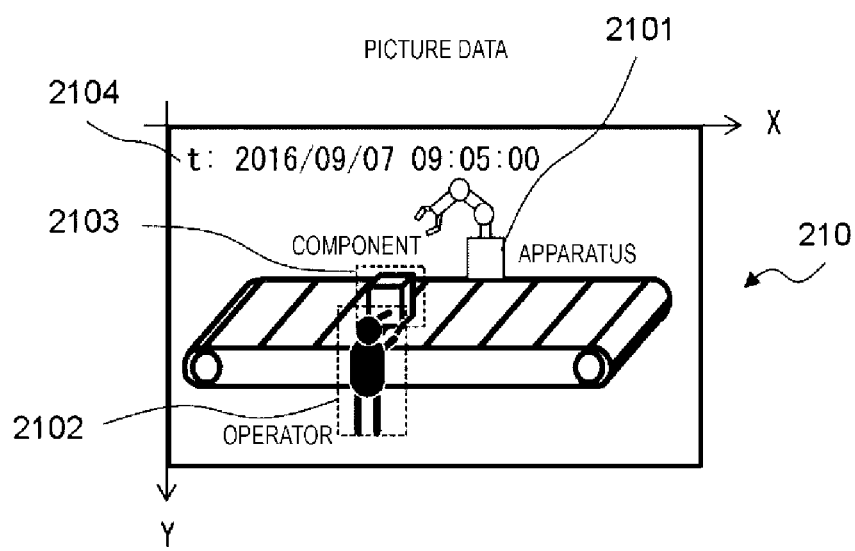

PICTURE DATA
2101 — APPARATUS
2102 — OPERATOR
2103 — COMPONENT
2104 — t: 2016/09/07 09:05:00
210

FIG. 7

PICTURE EXTRACTION DATA — 211

| POINT IN TIME | POSITION | OBJECT TYPE | OPERATION/STATE |
|---|---|---|---|
| 9:05 | Xa, Ya | OPERATOR | WOBBLING |
| 9:05 | Xb, Yb | COMPONENT | WATER LEAKAGE |

FIRST PHENOMENON PROBABILITY MODEL — 212a

| POSITION | OBJECT ID | OBJECT TYPE | SUB-OBJECT ID | ADDITIONAL INFORMATION | PROBABILITY |
|---|---|---|---|---|---|
| X0, Y0, Z0 (EXPRESSED WITH 4 POINTS) | OPERATOR C | – | COMPONENT β | – | 0.1 |
| X0, Y0, Z0 (EXPRESSED WITH 4 POINTS) | OPERATOR C | – | COMPONENT γ | – | 0.001 |

SECOND PHENOMENON PROBABILITY MODEL — 212b

| POSITION | OBJECT ID | OBJECT TYPE | SUB-OBJECT ID | ADDITIONAL INFORMATION | PROBABILITY |
|---|---|---|---|---|---|
| – | OPERATOR C | – | COMPONENT β | PACKING | 0.1 |
| – | OPERATOR C | – | COMPONENT γ | PAINTING | 0.001 |

— 1003
— 1004

FIG. 10
APPARATUS META DATA

| APPARATUS ID | PLACE | APPARATUS NAME |
|---|---|---|
| APPARATUS 1 | X0, Y0, Z0 (EXPRESSED WITH 4 POINTS) | JKL456 |

FIG. 11
COMPONENT META DATA

| POINT IN TIME | OBJECT ID | COMPONENT NAME | WEIGHT |
|---|---|---|---|
| 9:05 | COMPONENT β | XYZ789 | 10kg |
| 9:05 | COMPONENT γ | ABC123 | 5kg |

FIG. 12
OPERATOR META DATA

| OPERATOR ID | OPERATOR NAME | NUMBER OF CONTINUOUS EMPLOYMENT YEARS |
|---|---|---|
| OPERATOR C | Yamada | 20 |
| OPERATOR D | Tanaka | 10 |

DIAGRAM FOR DESCRIBING SAME-OBJECT ESTIMATION PROCESSING

DIAGRAM FOR DESCRIBING INTER-OBJECT RELEVANCE ESTIMATION PROCESSING

DIAGRAM FOR DESCRIBING ALERT PROCESSING

DIAGRAM FOR DESCRIBING SEARCH PROCESSING

DIAGRAM FOR DESCRIBING VISUALIZATION PROCESSING

DIAGRAM FOR DESCRIBING ANALYSIS PROCESSING

OBJECT ENVIRONMENT INPUT AND OUTPUT ESTIMATION PROCESSING

DIAGRAM FOR DESCRIBING OBJECT ENVIRONMENT INPUT AND OUTPUT ESTIMATION PROCESSING

DIAGRAM FOR DESCRIBING VISUALIZATION PROCESSING

FIG. 36
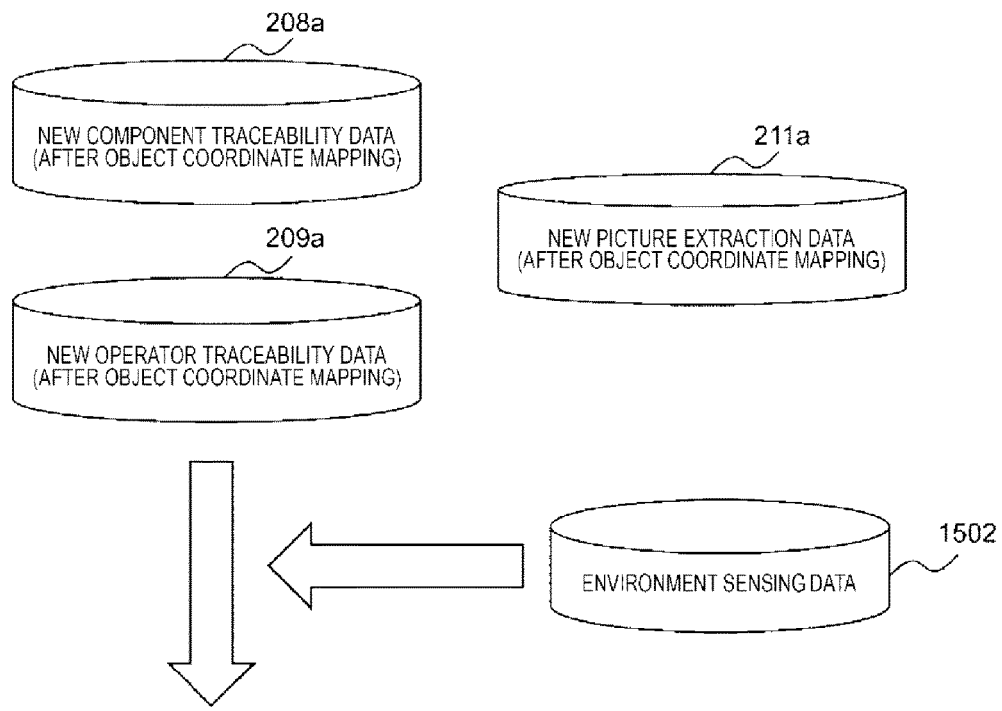
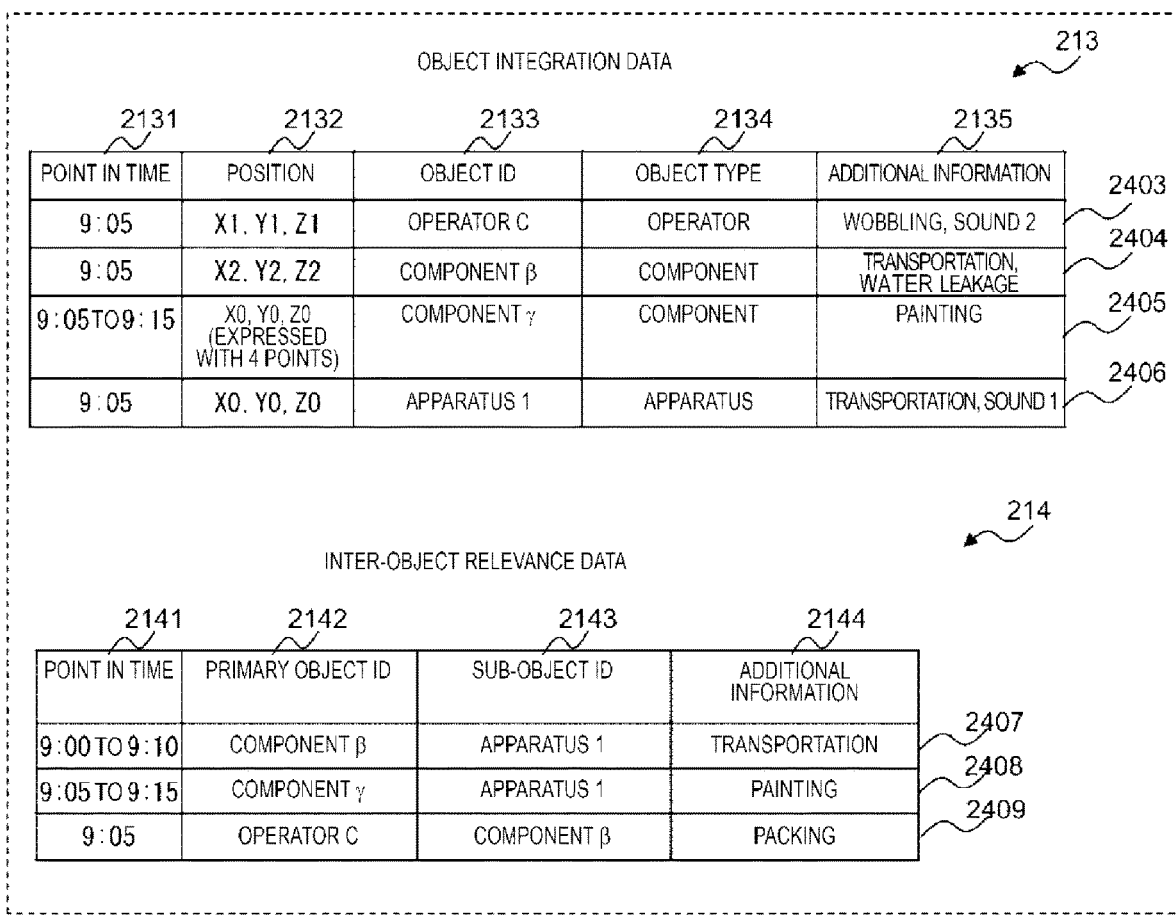

MANUFACTURING MANAGEMENT METHOD AND MANUFACTURING MANAGEMENT SYSTEM

CROSS-REFERENCE TO RELATED APPLICATION

This application claims priority pursuant to 35 U.S.C. § 119 from Japanese Patent Application No. 2017-44157, filed on Mar. 8, 2017, the entire disclosure of which is incorporated herein by reference.

BACKGROUND

The present invention relates to a manufacturing management method and a manufacturing management system.

In a site where a product or the like is manufactured, attempts are made not only to secure the safety of the product or the like, but also to reduce a manufacturing cost, improve the production efficiency for the reduction of the manufacturing cost, or improve product quality by reducing the number of poor-quality products, and everyday, attempts are made for elimination of or solutions to problems that occur in the site.

On the other hand, with advances in information technologies (IT), such as network, sensing, and interpretation, in recent years, the integration management or visual control (visualization) of data that is sensed in a manufacturing site, the study of the large-volume data interpretation technology, and the like have been in progress. In the manufacturing site, until one product is manufactured, a plurality of apparatuses process components of the product. Furthermore, in the manufacturing site, not only an apparatus, but also a plurality of operators are involved. Accordingly, it is demanded that pieces of information of an apparatus, a component, and an operator are integrated, and manufacturing processes including completion of production of a product and shipping are grasped, that is, an attempt is made to enhance traceability. This is expected to lead to improvement in product quality and production efficiency.

In the related art, for this purpose, for example, JP-A-2005-346614 discloses that in a food factory, an ID tag is attached to a container for storing a workpiece, the tag is read for input and output in each process, and thus it is known that to which process each workpiece is sent. Furthermore, JP-A-2011-34234 discloses that an object, such as a human hand, is recognized from a picture that results from image capture by a camera, a moving line for the object is tracked, and thus a type and a position of an object including a person, such as an operator, are known in a time series.

However, a target that is managed as disclosed in JP-A-2005-346614, is a workpiece, that is, a component, and it is not possible to associate the operator involved in processing the component with the component.

On the other hand, with the technology in JP-A-2011-34234, distinguishing among persons and determination of a type of component are possible, but like the ID that is taken as an example in JP-A-2005-346614, information that specifies an object cannot be extracted. In order to increase the traceability data, for example, the integration of the traceability data that allows a process of processing the object in a time series or details of the processing to be managed and data that, in a time series, indicates which type of object is positioned at which position, is necessary.

SUMMARY

An object of the invention, which is made in view of this background, is to provide a manufacturing management method and a manufacturing management system that are capable of increasing traceability in a process of manufacturing a product.

According to an aspect of the invention, which is intended to solve the problems described, there is provided a manufacturing management method of managing a product that is manufactured by performing a plurality of processing operations on a component implemented by an information processing apparatus that includes a processor and a memory, comprising storing traceability information that is information which results from associating an apparatus that processes the component, an operating person who is in charge of the processing, and a timing at which the processing is performed, with each other; storing processing situation information that is information that results from associating a situation of the processing of the component and a timing at which the processing is performed, with each other; generating a combination at the same timing, of the processing, the apparatus or the operating person, and the situation of the processing, as an object integration data, based on the traceability information and the processing situation information; and outputting contents of the generated object integration data.

According to the invention, traceability can be increased in a process of manufacturing a product.

Problems, configurations, and effects other than those described above are apparent from descriptions of embodiments as follows.

BRIEF DESCRIPTION OF THE DRAWINGS

FIG. 4 is a diagram illustrating an example of component traceability data.

FIG. 5 is a diagram illustrating an example of operator traceability data.

FIG. 6 is a diagram illustrating an example of picture data.

FIG. 7 is a diagram illustrating example of the picture extraction data.

FIG. 8 is a diagram illustrating an example of a first phenomenon probability model.

FIG. 9 is a diagram illustrating an example of a second phenomenon probability model.

FIG. 10 is a diagram illustrating an example of an apparatus metadata.

FIG. 11 is a diagram illustrating an example of component metadata.

FIG. 12 is a diagram illustrating an example of operator metadata.

FIG. 36 is a diagram for describing an example of same-object estimation processing, inter-object relevance estimation processing, and environment input and output estimation processing according to the fourth embodiment.

DETAILED DESCRIPTION OF EMBODIMENTS

A manufacturing management system according to each embodiment of the invention will be described below.

The manufacturing management system according to each embodiment is an information processing system that manages a product that is manufactured by performing (performing processes) a plurality of processing operations on any components. The manufacturing management system performs product manufacturing management, based on traceability information that is information which results from associating the component, an apparatus that processes the component, an operating person who is in charge of the component and a timing at which the processing is performed with each other, and processing situation information that is information which results from associating a situation of processing that is performed by the apparatus, and a timing at which the processing is performed.

It is noted that the component according to the present embodiment may be a commodity that is the same as a product which is a finished good, and may be a plurality of parts that constitute the product which is the finished good.

First Embodiment

First, the manufacturing management system according to the first embodiment uses image data as the processing situation information. That is, the processing situation information includes information of an image that results from image-capturing a situation of the processing of the component.

Figure 1:
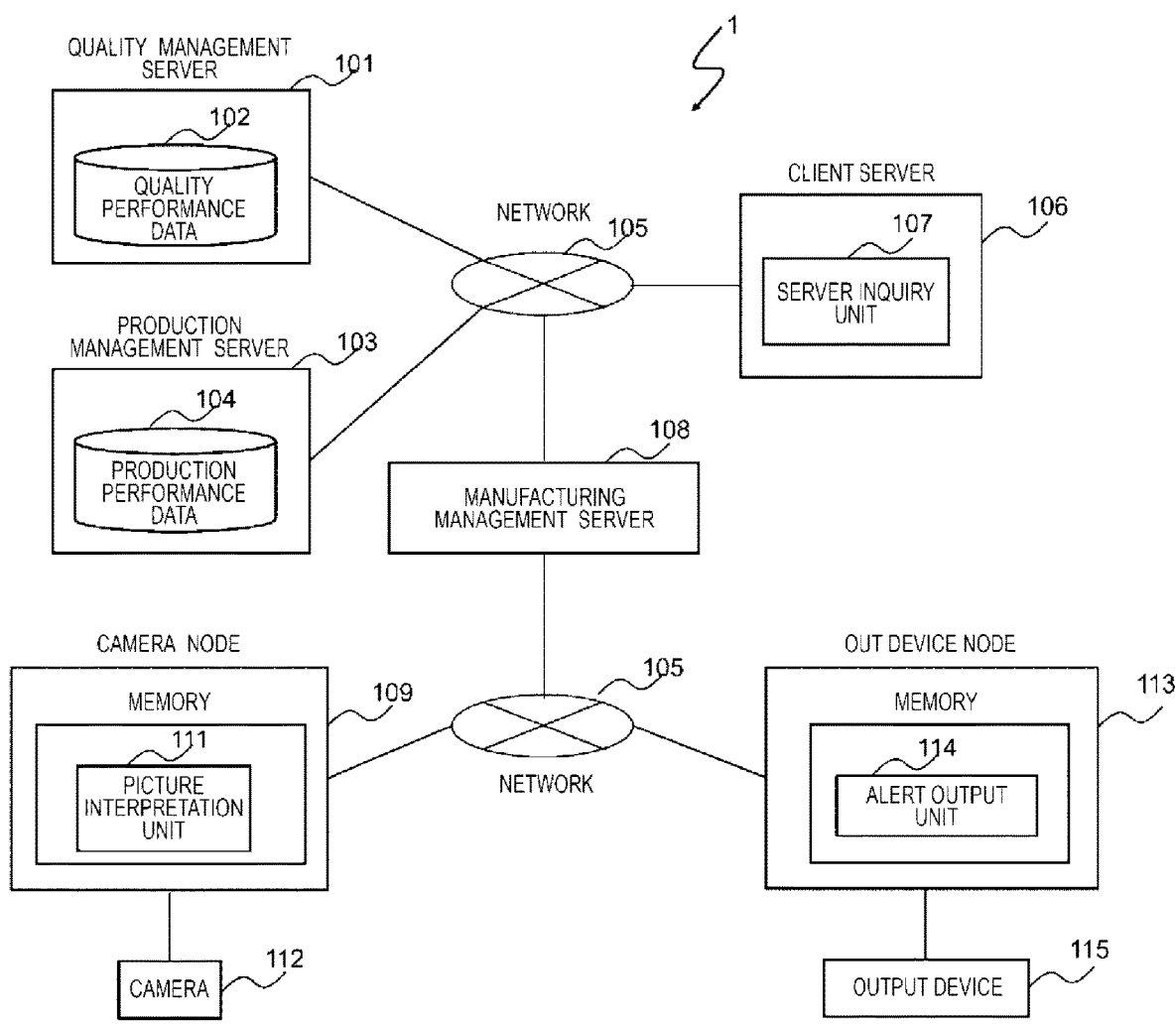
FIG. 1 is a diagram for describing an example of a configuration of a manufacturing management system according to the first embodiment.

FIG. 1 is a diagram for describing an example of a configuration of a manufacturing management system 1 according to the first embodiment. As illustrated in FIG. 1, the manufacturing management system 1 is configured to include a manufacturing management server 108, a camera node 109, an output device node 113, a quality management server 101, a production management server 103, and an information processing apparatus (a computer) of each of the client nodes 106.

A connection is made between each of the information processing apparatuses through a network 105 in a manner that makes communication possible. The network 105, for example, is a wired or wireless communication line or communication network, such as a local area network (LAN), a wide area network (WAN), the Internet, a dedicated network, a mobile telephone network, or an optical fiber.

The quality management server 101 is a server that manages quality of manufactured products, and specifically stores quality performance data 102 that is information relating to quality of manufactured products.

The production management server 103 is a server that manages types or quantities of manufactured products, and specifically stores production performance data 104 that is information relating to types or quantities of manufactured products.

The camera node 109 image-captures a thing or a person (specifically, a component, an apparatus that performs processing of the component, an operating person who is in charge of the component, or the like, which hereinafter referred to as an object) in a product production site, and is connected to a camera 112 that acquires the image thereof, in a manner that makes communication with the camera 112 possible. The camera 112 is provided at each place in a manufacturing site, image-captures an appearance of each manufacturing processing at any time (for example, at a predetermined time interval or at a predetermined timing), and generates predetermined image data. It is noted that the camera node 109 stores information relating to a place where each camera 112 is installed or information indicating an image capture range of each camera 112.

The camera node 109 includes a picture interpretation unit 111 to perform a function thereof. The picture interpretation unit 111 acquires the image that is captured by the camera 112, and performs interpretation (specifically, for example, interpretation of the object) of the acquired image. The image interpretation, for example, is performed by a statistical machine learning that is based on various images that are acquired from, for example, a world wide web (web) and the like.

The output device node 113 is connected to an output device 115, such as a patrol car lamp, a smartwatch, a projector, or a display, in a manner that makes communication possible. The camera node 109 includes an alert output unit 114 to perform a function thereof. The alert output unit 114 transmits warning information (hereinafter referred to as alert information) relating to product manufacturing to the output device 115. The output device 115 outputs the received alert information.

The manufacturing management server 108 is a server that manages the product manufacturing, and performs the product manufacturing management based on the traceability information and the processing situation information. Furthermore, the manufacturing management server 108, for example, receives an image that is acquired by the camera node 109, or transmits the alert information to the output device node 113.

The client node 106 is a server for accessing various pieces of information that are stored in other information processing apparatuses. The client node 106 includes a server inquiry unit 107 to perform a function thereof. The server inquiry unit 107 performs transmission and reception of information to and from the quality management server 101, the production management server 103, and the manufacturing management server 108.

Figure 2:
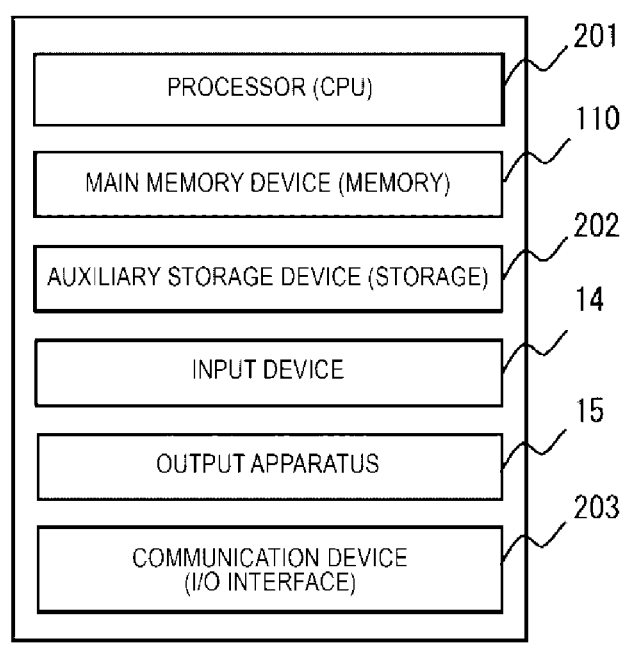
FIG. 2 is a diagram for describing hardware constituent elements that are included in each information processing apparatus.

Moreover, at this point, hardware constituent elements that are included in each of the information processing apparatuses (the quality management server 101, the production management server 103, the client node 106, the manufacturing management server 108, the camera node 109, and the output device node 113) are described. FIG. 2 is a diagram for describing the hardware constituent elements that are included in each information processing apparatus. As illustrated in FIG. 2, each information processing apparatus includes a processor 201, such as a central processing unit (CPU), main memory devices 110, such as a random access memory (RAM) and a read only memory (ROM), an auxiliary storage device 202, such as a hard disk drive (HDD) or a solid state drive (SSD), an input device 14, such as a keyboard, a mouse, or a touch panel, and an output device 15, such as a monitor (display), and a communication device 203 that communicates with other information processing apparatus.

A function of the manufacturing management server 108 is described.

Figure 3:
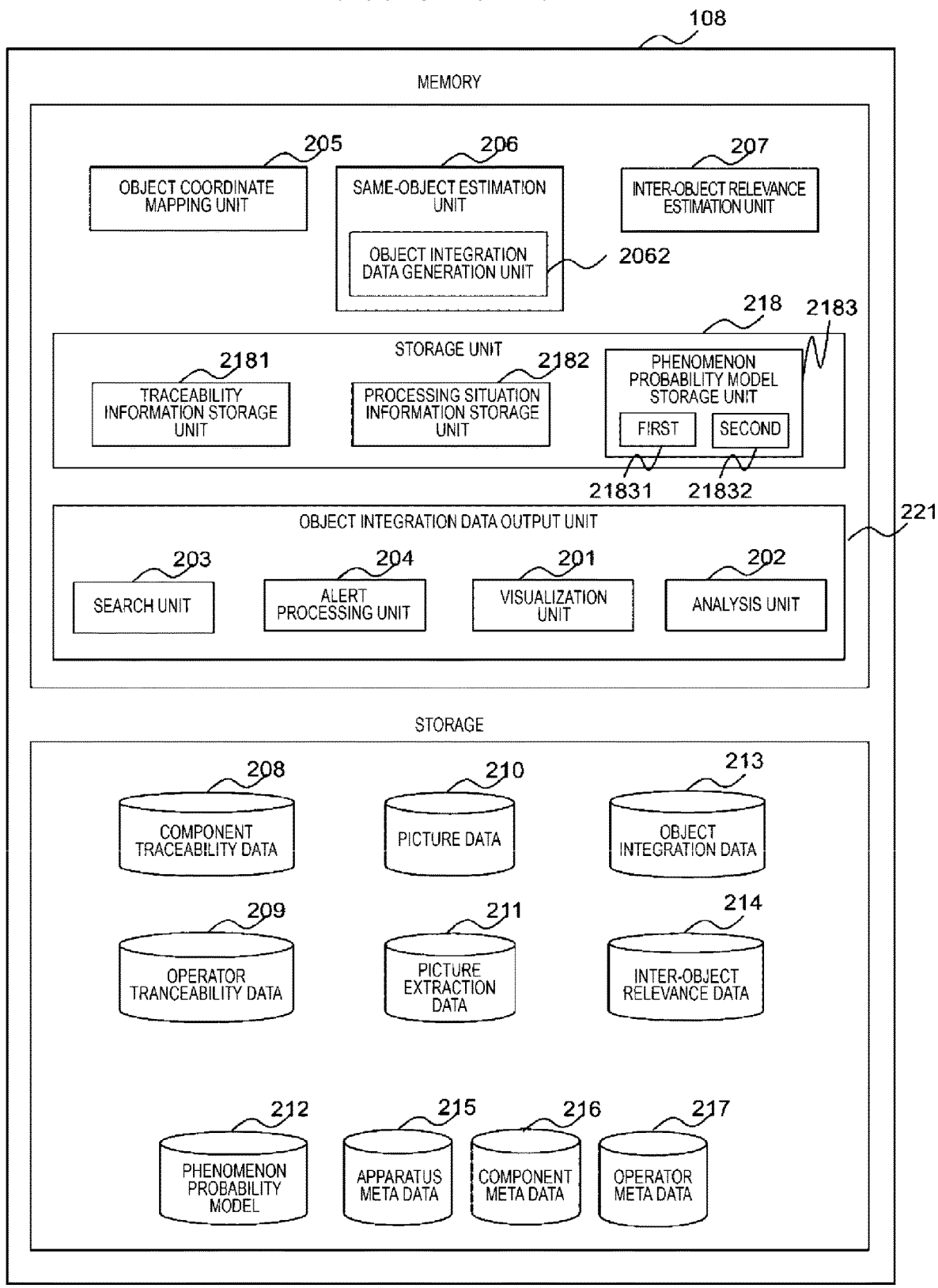
FIG. 3 is a diagram for describing an example of a function that a manufacturing management server has.

FIG. 3 is a diagram for describing an example of the function that the manufacturing management server 108 has. As illustrated in FIG. 3, the manufacturing management server 108 includes an object coordinate mapping unit 205, a same-object estimation unit 206, an inter-object relevance estimation unit 207, a storage unit 218, and an object integration data output unit 221.

The object coordinate mapping unit 205 converts information of a position of an object, which is included in traceability information data, into information of a position in an actual space.

The same-object estimation unit 206 performs integration of the traceability information and work information situation information. Specifically, the same-object estimation unit 206 includes an object integration data generation unit 2062.

The object integration data generation unit 2062 generates a combination at the same timing, of the processing, the apparatus or the operating person, and the situation of the processing, as object integration data, based on the traceability information and the processing situation information.

It is noted that the traceability information is information that includes a position where the processing of the component is performed and a position of the operating person who is in charge of the processing. In this case, the object integration data generation processing generates the combination at the same timing and at the same place, of the processing, the apparatus or the operating person, and the situation of the processing, as the object integration data, based on the position where the processing of the component is performed and the position of the operating person who is in charge of the processing.

The inter-object relevance estimation unit 207 acquires a plurality of the pieces of object integration data, and estimates the relevance among the acquired pieces of object integration data.

Next, the storage unit 218 includes a traceability information storage unit 2181, a processing situation information storage unit 2182, and a phenomenon probability model storage unit 2183.

The traceability information storage unit 2181 stores the traceability information that is information which results from associating the apparatus that processes the component, the operating person who is in charge of the processing, and the timing at which the processing is performed, with each other.

At this point, component traceability data 208 and the operator traceability data 209 are described.

FIG. 4 is a diagram illustrating an example of the component traceability data 208. As illustrated in FIG. 4, the component traceability data 208 is configured with at least one or more records, each of which has fields, that is, a point in time 2081 under which information specifying a point in time is stored, a component ID 2082 under which information (hereinafter referred to as a component ID) identifying a component is stored, an apparatus ID 2083 under which information (hereinafter referred to as an apparatus ID) identifying an apparatus that processes a component with the component ID 2082 is stored, and a processing detail 2084 under which information specifying a detail (for example, component transportation or component painting) of processing that is performed by an apparatus with the apparatus ID 2083 is stored.

In this manner, the component traceability data 208 is information stored, which results from a component, an apparatus that processes the component, a detail of the processing and a timing at which the processing is performed, with each other.

Next, FIG. 5 is a diagram illustrating an example of the operator traceability data 209. As illustrated in FIG. 5, the operator traceability data 209 is configured with at least one or more records, each of which has fields, that is, a point in time 2091 under which information specifying a point in time is stored, an operator ID 2092 under which information (hereinafter referred to as an operator ID) specifying an operating person stored, and an apparatus ID 2093 under which information (an apparatus ID) identifying an apparatus that processes a component in which an operating person with the operator ID 2092 is in charge is stored.

In this manner, the operator traceability data 209 is information stored, which results from associating an operator (operating person), an apparatus that processes a component of which the operator is in charge, and a timing at which such an operation is performed, with each other.

Subsequently, as illustrated in FIG. 3, the processing situation information storage unit 2182 stores the processing situation information that is information which results from associating a situation of processing of the component and a timing at which the processing is performed. Specifically, the processing situation information is stored in picture data 210, and picture extraction data 211.

At this point, the picture data 210 and the picture extraction data 211 are described.

FIG. 6 is a diagram illustrating an example of the picture data 210. As illustrated in FIG. 6, the picture data 210 is the image data that is generated by the camera 112. Recorded (image-captured into) in the picture data 210 are at least one or more of the following: an apparatus 2101, an operating person 2102 who performs an operation using the apparatus 2101, and a component 2103 that is processed by the apparatus 2101. It is noted that information 2104 on a point in time at which an image is generated is attached to the picture data 210.

Next, FIG. 7 is a diagram illustrating an example of the picture extraction data 211. As illustrated in FIG. 7, the picture extraction data 211 is a table in which the processing situation information (image information) that is extracted from the picture data 210 is stored. Specifically, the picture extraction data 211 is configured with at least one or more records, each of which has, that is, a point in time 2111 under which information specifying a point in time at which an image is generated is stored, an object type 2113 under which information (hereinafter referred to as an object type) identifying a type of an object that is included in the picture data 210 is stored, a position 2112 under which information specifying a position (which, in the present embodiment, is defined as being shown in a two-dimensional coordinate system) on the picture data 210, at which an object under the object type 2113 is image-captured, is stored, and an operation state 2114 under which information (for example, "packing" indicating a situation that packing of a component is performed, or "water leakage" indicating that water leaks from an apparatus that processes a component) indicating a situation of processing a component, which is interpreted from image information of the picture data 210, is stored.

In this manner, the picture extraction data 211 is information stored, which results from associating a type of an object on the picture data 210, a position of an image of the object, a point in time at which such processing is performed, and a situation of processing that is shown by the picture data 210.

Subsequently, as illustrated in FIG. 3, the phenomenon probability model storage unit 2183 includes a first phenomenon probability model storage unit 21831 and a second phenomenon probability model storage unit 21832.

Stored in the first phenomenon probability model storage unit 21831 is a first phenomenon probability model that is information relating to a probability that a combination of the operating person and the component on which processing in which the operating person is in charge is performed will occur at the same timing. In this case, the object integration data generation unit 2062 generates the object integration data, with the object integration data generation processing being based on the first phenomenon probability model.

Stored in the second phenomenon probability model storage unit 21832 is a second phenomenon probability model that is information relating to a probability that a combination of the situation of the processing of the component and the operator or the component will occur at the same timing. In this case, the inter-object relevance estimation unit 207 estimates the relevance among the pieces of object integration data, based on the second phenomenon probability model.

It is noted that as illustrated in FIG. 3, the first phenomenon probability model and the second phenomenon probability model are stored in phenomenon probability model 212.

At this point, a specific example of the phenomenon probability model 212 is described.

FIG. 8 is a diagram illustrating an example of the first phenomenon probability model. As illustrated in FIG. 8, a first phenomenon probability model 212a is configured as at least one or more records that have fields, that is, a position 2121 (in the present embodiment, it is assumed that predetermined three dimensional coordinates are set with respect to a space in a product manufacturing site and that an object is a rectangular thing that is present in the three-dimensional coordinate space. Then, four vertexes of the rectangular thing are defined as indicating a position in an actual space, of an object that is assigned using the three-dimensional coordinates) under which information indicating a position in an actual space, of an object is stored, an object ID 2122 under which information (hereinafter referred to as an object ID) indicating an object that is present under the position 2122 is stored, an object type 2123 under which information specifying a type (an object classification, for example, an operator) of an object under the object ID 2121 is stored, a sub-object ID 2124 under which information (hereinafter referred to as a sub-object ID) identifying another object (hereinafter referred to as a sub-object, for example, a component that is processed by an apparatus which is present in the vicinity) that is different from the object under the object type 2123, which is present in the vicinity of a position under the position 2121, is stored, additional information 2125 under which information indicating a processing detail of a component is stored, and a probability 2126 under which a probability (a phenomenon probability) that a phenomenon which is specified by contents under the position 2121, the object ID 2122, the sub-object ID 2124 and the additional information 2125 will occur is stored.

In the first phenomenon probability model 212a, information is stored under each of the fields, that is, the position 2121, the object ID 2122, the sub-object ID 2124, and the probability 2126.

FIG. 9 is a diagram illustrating an example of a second phenomenon probability model. As illustrated in FIG. 9, a second phenomenon probability model 212b is a table that has the same fields as the first phenomenon probability model 212a. In the second phenomenon probability model 212b, information is stored under each of the fields, that is, the object ID 2122, the sub-object ID 2124, the additional information 2125, and the probability 2126.

Next, as illustrated in FIG. 3, object integration data 213, inter-object relevance data 214, apparatus metadata 215, component metadata 216, and operator metadata 217 are stored in the storage unit 218.

At this point, the apparatus metadata 215 is described.

FIG. 10 is a diagram illustrating an example of the apparatus metadata 215. Information relating to an attribute of each apparatus is stored in the apparatus metadata 215. The apparatus metadata 215 is a database that is configured with at one or more records, each of which has fields, that is, an apparatus ID 2151 under which an apparatus ID is stored, a place 2152 under which information indicating a position (in the present embodiment, the position in the actual space is defined as being expressed in the same format as the position 2121 in the phenomenon probability model 212) in the actual space in which an apparatus under the apparatus ID 2151 is installed is stored, and an apparatus name 2153 under which information of an apparatus under the apparatus ID 2151 is stored.

Next, the component metadata 216 is described.

FIG. 11 is a diagram illustrating an example of the component metadata 216. Information relating to an attribute of each component is stored in the component metadata 216. The component metadata 216 is configured with at least one or more records, each of which has fields, that is, an object ID 2162 under which a component ID is stored, a component name 2163 under which information of a name of a component under the object ID 2162 is stored, weight 2164 under which information of a weight of the component under the object ID 2162 is stored, and a point in time 2161 under which information indicating a point in time at which the component under the object ID 2162 is stored.

Next, the operator metadata 217 is described.

FIG. 12 is a diagram illustrating an example of the operator metadata 217. Information relating to an attribute of each operator is stored in the operator metadata 217. The operator metadata 217 is configured with at least one or more records, each of which has fields, that is, an operator ID 2171 under which an operator ID is stored, an operator name 2172 under which information of the full name or the like of an operator under the operator ID 2171 is stored, and the number of continuous employment years 2173 under which information indicating years of continuous employment of the operator under the operator ID 2171 is stored.

Next, the object integration data output unit 221 that is illustrated in FIG. 3 outputs contents of the generated object integration data. Specifically, for example, the object integration data output processing outputs information indicating the estimated relevance.

That is, the object integration data output unit 221 includes a search unit 203, an alert processing unit 204, a visualization unit 201, and an analysis unit 202. These processing operations will be described in detail below.

A function of each information processing apparatus described above is realized by hardware of pieces of each information processing apparatus, or by a processor of each information processing apparatus reading and executing a program stored in the processor itself or a memory.

Processing

Next, processing that is performed in the manufacturing management system 1 is described.

Manufacturing Management Processing

Figure 13:
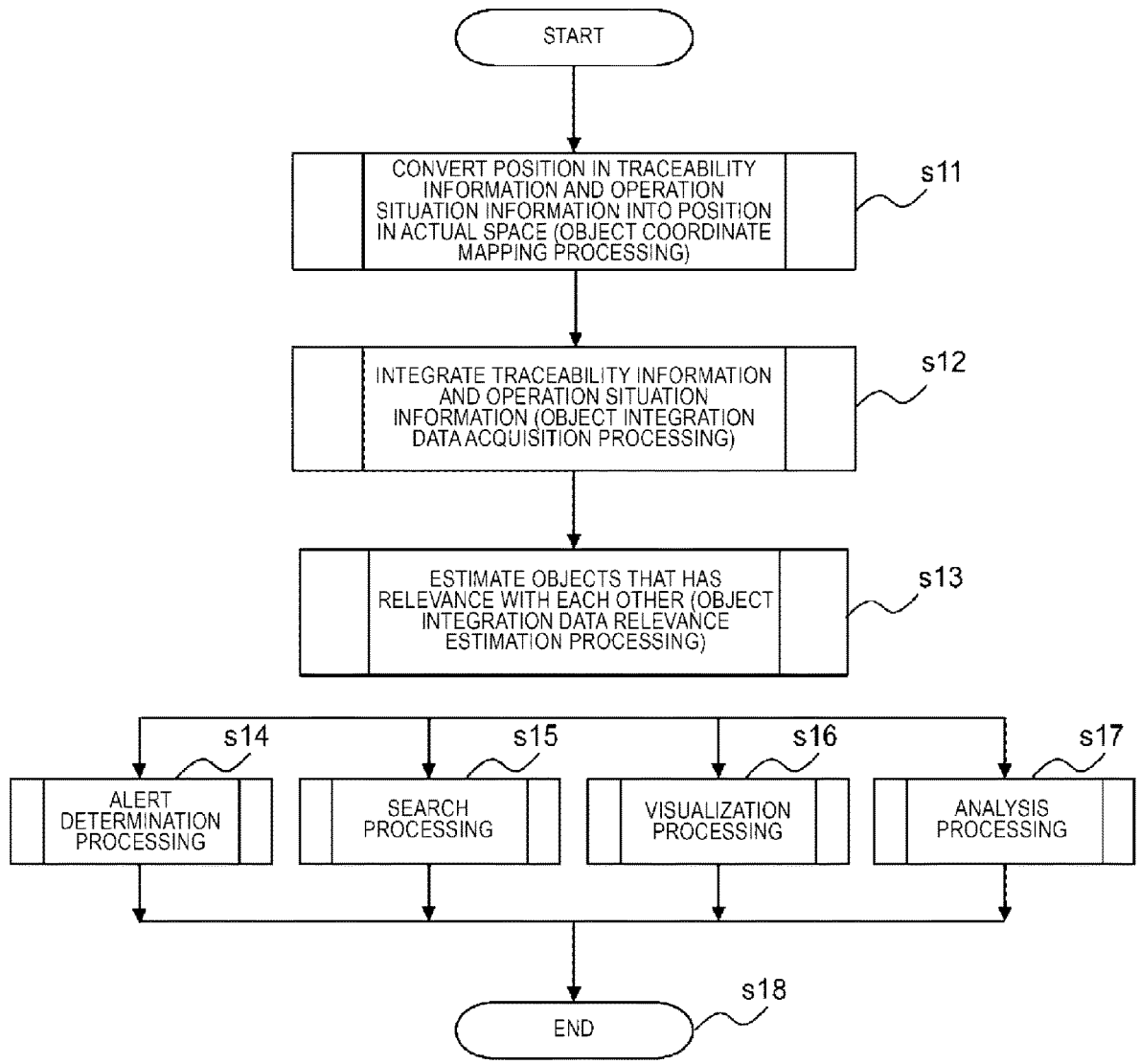
FIG. 13 is a flowchart for describing an example of manufacturing management processing.

FIG. 13 is a flowchart for describing an example of processing (hereinafter referred to as manufacturing management processing) that manages product manufacturing by integrating the traceability information and the processing situation information, which is performed in the manufacturing management system 1. It is noted that starting of this processing is triggered by a user performing predetermined input into the manufacturing management server 108 or the client node 106.

As illustrated in FIG. 13, first, the manufacturing management server 108 performs processing (hereinafter referred to as object coordinate mapping processing) that converts information of a position that is included in the traceability information and processing situation information, into information of a position in an actual space (s11). The object coordinate mapping processing will be described in detail below.

Next, the manufacturing management server 108 integrates the traceability information and the processing situation information on which the object coordinate mapping processing is performed, and performs processing (referred to as object integration data acquisition processing) that generates the object integration data (s12). The object integration data acquisition processing will be described in detail below.

Next, the manufacturing management server 108 performs processing (hereinafter referred to as object integration data relevance estimation processing) that estimates pieces of object integration data which have relevance with each other from a plurality of pieces of object integration data that are integrated in s12 (s13). The object integration data relevance estimation processing will be described in detail below.

Then, based on a result of the object integration data relevance estimation processing, the manufacturing management server 108 performs processing that outputs a predetermined alert (hereinafter referred to as alert processing), processing (hereinafter referred to as search processing) that conducts a search for predetermined information), processing (hereinafter referred to as visualization processing) that illustrates predetermined information relating to a product manufacturing situation, or processing (hereinafter referred to as analysis processing) that analyzes the product manufacturing situation (s14 to s17). The manufacturing management processing ends with the above processing (s18).

It is noted that, for example, the reception by the manufacturing management server 108 or the client node 106 of input for assignment of a type of processing to be performed from the user causes any of the processing operations in s14 to s17 to be performed (for example, the client node 106 is caused to display a predetermined menu screen and input is received from the user).

Each processing operation in the manufacturing management processing will be in detail described below.

Object Coordinate Mapping Processing

Figure 14:
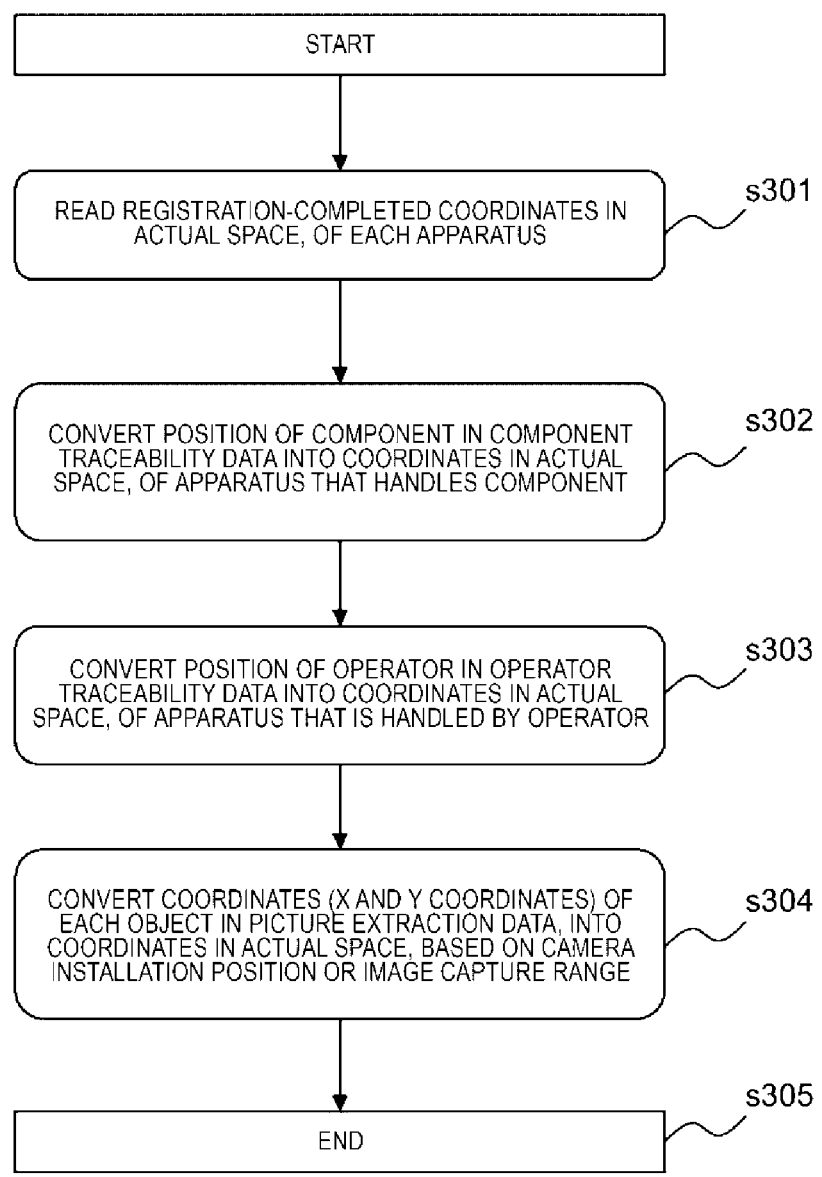
FIG. 14 is a flowchart for describing an example of object coordinate mapping processing.

FIG. 14 is a flowchart for describing an example of the object coordinate mapping processing. As illustrated in FIG. 14, the manufacturing management server 108 reads coordinates of each apparatus in an actual space, which processes a component (s301), converts a position of each apparatus on an image, which is recorded in the component traceability data 208, into a position in the actual space, using the coordinate in the actual space, which is read, and thus generates new component traceability data 208 (hereinafter referred to as a new component traceability data 208*a*) (S302).

Figure 15:
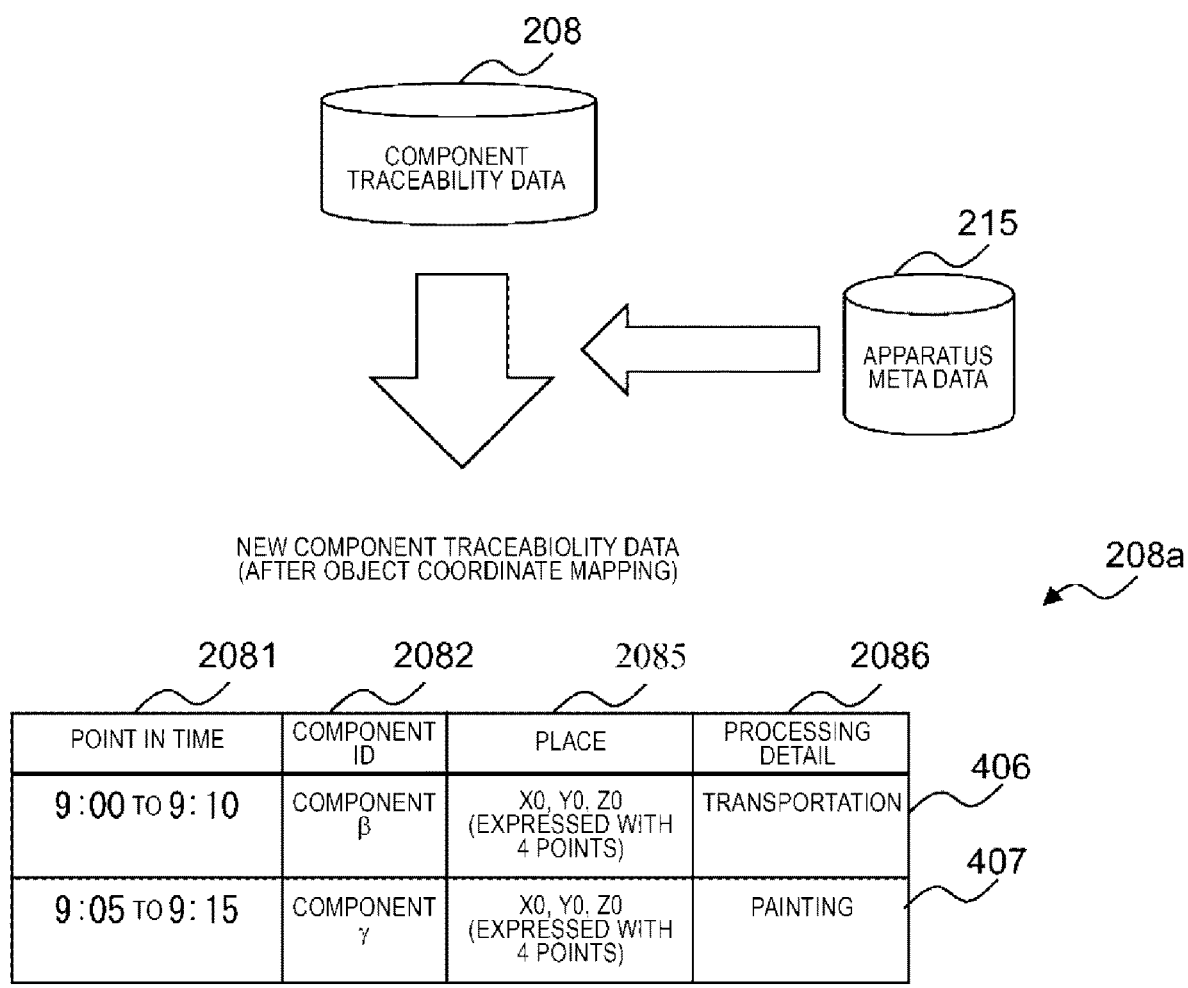
FIG. 15 is a diagram for describing an example of processing in s302.

It is noted that FIG. 15 is a diagram for describing processing in s302. As illustrated in FIG. 15, the new component traceability data 208*a* is generated based on the component traceability data 208 and the apparatus metadata 215, and is specifically configured with at least one or more records, each of which has fields, that is, a point in time 2081 that corresponds to the point in time 2081 in the component traceability data 208, a component ID 2082 that corresponds to the component ID 2082 in the component traceability data 208, a place 2085 that corresponds to the place 2152 in the apparatus metadata 215, and a processing detail 2086 that corresponds to the processing detail 2084 in the component traceability data 208.

For example, the manufacturing management server 108 integrates a record 404 showing that "apparatus 1" performs processing, which is "transportation", on "component β", among records in the component traceability data 208, and a record 405 showing that "apparatus 1" performs processing, which is painting, on component γ", and a record 408 in the apparatus metadata 215, in which a position of "apparatus 1" is recorded, and thus generates a record 406 and a record 407 in the new component traceability data 208*a*.

Next, as illustrated in s303 in FIG. 14, the manufacturing management server 108 converts a position of an operator on an image, which is recorded in the operator traceability data 209, into a position in an actual space, and thus generates a new operator traceability data 209 (hereinafter referred to as a new operator traceability data 209*a*).

Figure 16:
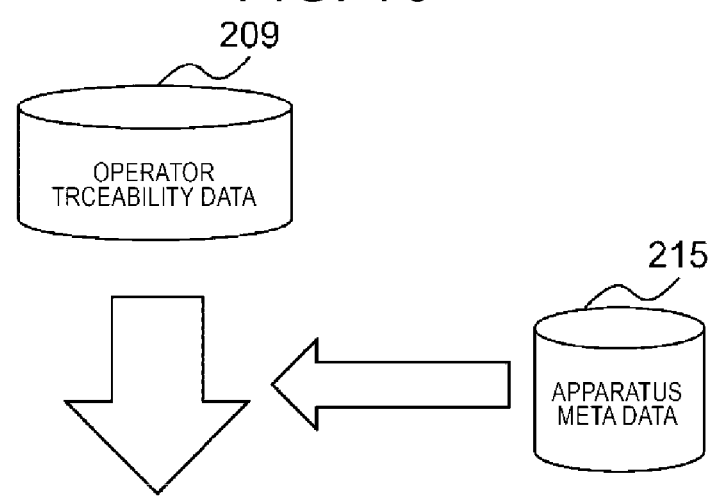
FIG. 16 is a diagram for describing an example of processing in s303.

Moreover, FIG. 16 is a diagram for describing an example of the processing in s303. As illustrated in FIG. 16, the new operator traceability data 209a is generated based on the operator traceability data 209 and the apparatus metadata 215, and is specifically configured with at least one or more records, each of which has fields, that is, a point in time 2091 that corresponds to the point in time 2091 in the operator traceability data 209, an operator ID 2092 that corresponds to the operator ID 2092 in the operator traceability data 209, and a place 2094 that corresponds to the place 2085 in the apparatus metadata 215.

For example, the manufacturing management server 108 generates a new record 504 in the new operator traceability data 209a, and then integrates a record 503 showing that "operator C" is in charge of "apparatus 1", among records in the operator traceability data 209, and a record 408 in which a position of "apparatus 1' is recorded, among records in the apparatus metadata 215, and stores integrated contents in the generated record 504.

Next, as illustrated in s304 in FIG. 14, the manufacturing management server 108 converts a position of each object on an image, which is registered in the picture extraction data 211, into a position in an actual space, and thus generates a new picture extraction data 211a (hereinafter referred to as a new picture extraction data 211a). It is noted that, for example, the manufacturing management server 108 calculates the position of each object in the actual space, based on the information of the installation position of each camera 112 and the information of the image capture range of each camera 112, which are acquired from the camera node 109. The object mapping processing ends with the above processing (s305).

Figure 17:
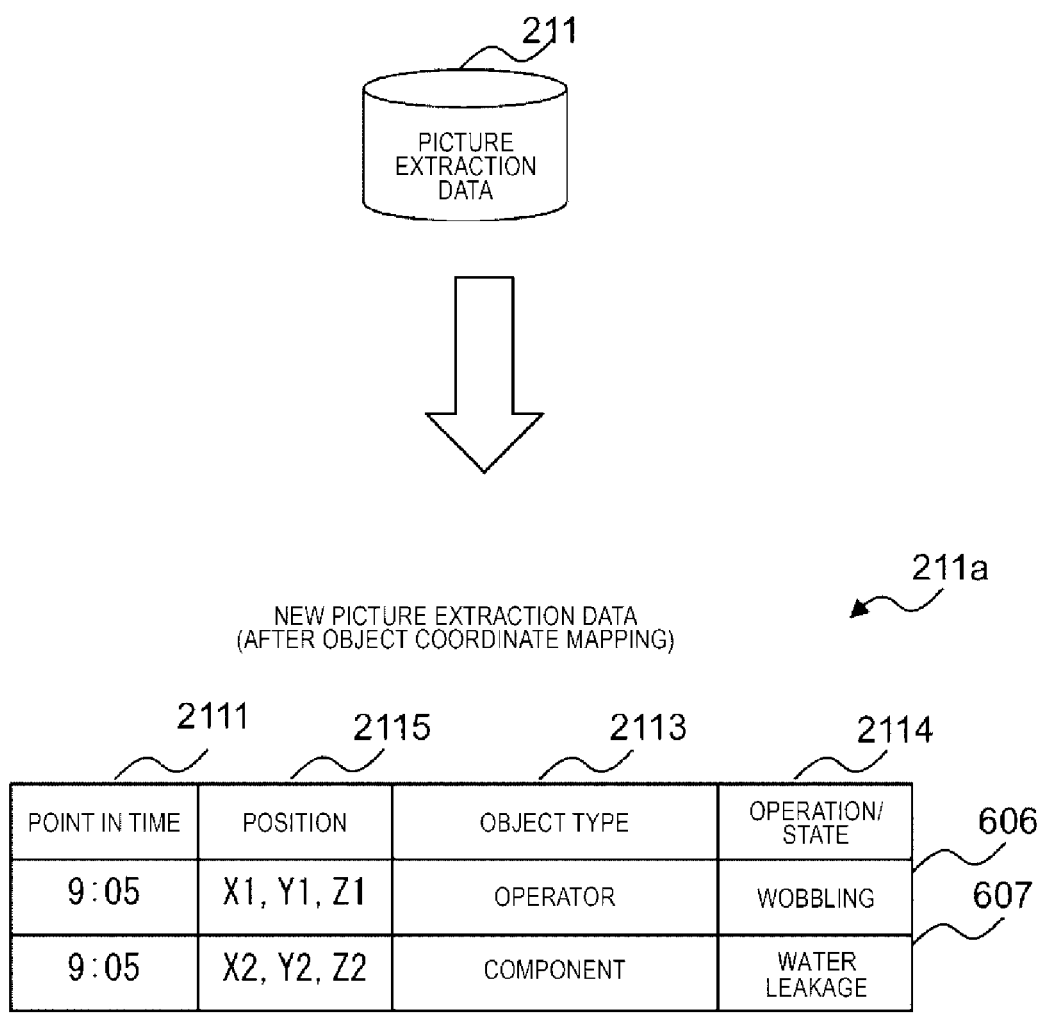
FIG. 17 is a diagram for describing an example of processing in s304.

Moreover, FIG. 17 is a diagram for describing an example of processing in s304. As illustrated in FIG. 17, the new picture extraction data 211a that is generated is configured with one or more records, each of which has fields, that is, a point in time 2111 that corresponds to the point in time 2111 in the picture extraction data 211, a position 2115 under which coordinates of an object in an actual space, which corresponds to the position 2112 in the picture extraction data 211 are stored, an object type 2113 that corresponds to the object type 2113 in the picture extraction data 211, and an operation state 2114 that corresponds to the operation state 2114 in the picture extraction data 211.

For example, the manufacturing management server 108 generates a new record 606 in the picture extraction data 211a, and then stores a detail under the point in time 2111 that is a field in the record 604 in the picture extraction data 211, under a point in time 2111 that is a field in the record 606, stores a detail under the object type 2113 that is a field in the record 604, under an object type 2113 that is a field in the record 606, stores a detail under the operation state 2114 that is a field in the record 604, under an operation state 2114 that is a field in the record 606, converts (Xa, Ya) under the position 2112 that is a field in the record 604, into (X1, Y1, Z1) that is a position in an actual space, and stores the position (X1, Y1, Z1) in the actual space, which results from the conversion, under a position 2115 that is a field in the record 606. In the same manner, the manufacturing management server 108 converts (Xb, Yb) that is stored under the position 2112 in the record 605 in the picture extraction data 211, into (X2, Y2, Z2) that is a position in an actual space, and stores the position (X2, Y2, Z2) in the actual space, which results from the conversion, under the position 2115 in the record 607 in the new picture extraction data 211a.

Same-Object Estimation Processing

Next, same-object estimation process is described.

Figure 18:
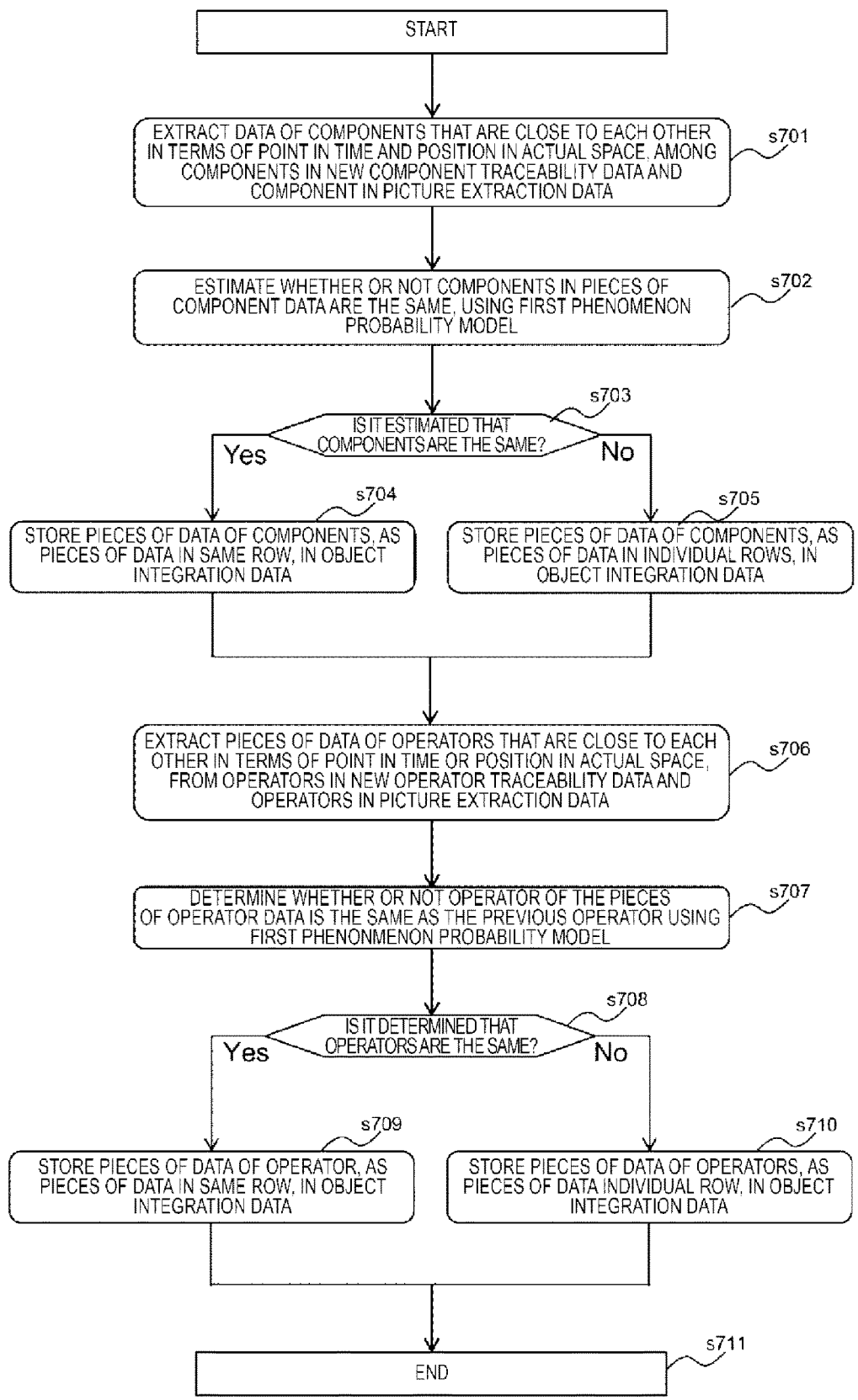
FIG. 18 is a flowchart for describing an example of same-object estimation processing.

FIG. 18 is a flowchart for describing an example of the same-object estimation processing. As illustrated in FIG. 18, first, the same-object estimation unit 206 of the manufacturing management server 108 extracts a component that is registered in the new component traceability data 208a and a component that is registered in the new picture extraction data 211a, which are close to each other in terms of a point in time and coordinates in an actual space (S701).

Then, the same-object estimation unit 206 determines whether or not two components that are extracted in s701 are the same component, referring to the first phenomenon probability model 212a (s702). In a case where it is determined that the two components are the same component (YES in s703), the same-object estimation unit 206 generates the object integration data relating to the component (s704). Specifically, the same-object estimation unit 206 generates one new record in the object integration data 213, and stores the object integration data relating to the same component under the generated record. Thereafter, processing in s706 is performed.

On the other hand, in a case where it is determined that the two objects are not the same component (NO in s703), the same-object estimation unit 206 individually generates the object integration data to each of the two components (s705). Specifically, the same-object estimation unit 206 stores the two pieces of object integration data relating to the two components under the two records, respectively, that are generated in the object integration data 213. Thereafter, processing in s706 is performed.

In s706, the same-object estimation unit 206 extracts an operator that is registered in the new operator traceability data 209a and an operator that is registered in the new picture extraction data 211a, who are close to each other in terms of a point in time and coordinates in an actual space (s706).

Then, the same-object estimation unit 206 determines whether or not the two operators that extracted in s706 are the same operator, referring to the first phenomenon probability model 212a (s707). In a case where it is determined that the two operators are the same operator (YES in s708), the same-object estimation unit 206 generates the object integration data relating to the operator (s709). Specifically, the same-object estimation unit 206 generates one new record in the object integration data 213, and stores the object integration data relating to the same operator under the generated record. The same-object estimation processing ends with the above processing (s711).

On the other hand, in a case where it is determined that the two operators are not the same operator (NO in s708), the same-object estimation unit 206 individually generates the object integration data relating to each of the two operators (s710). Specifically, the same-object estimation unit 206 stores the two pieces of object integration data relating to the two operators under the two records, respectively, that are newly generated in the object integration data 213. The same-object estimation processing ends with the above processing (s711).

Figure 19:
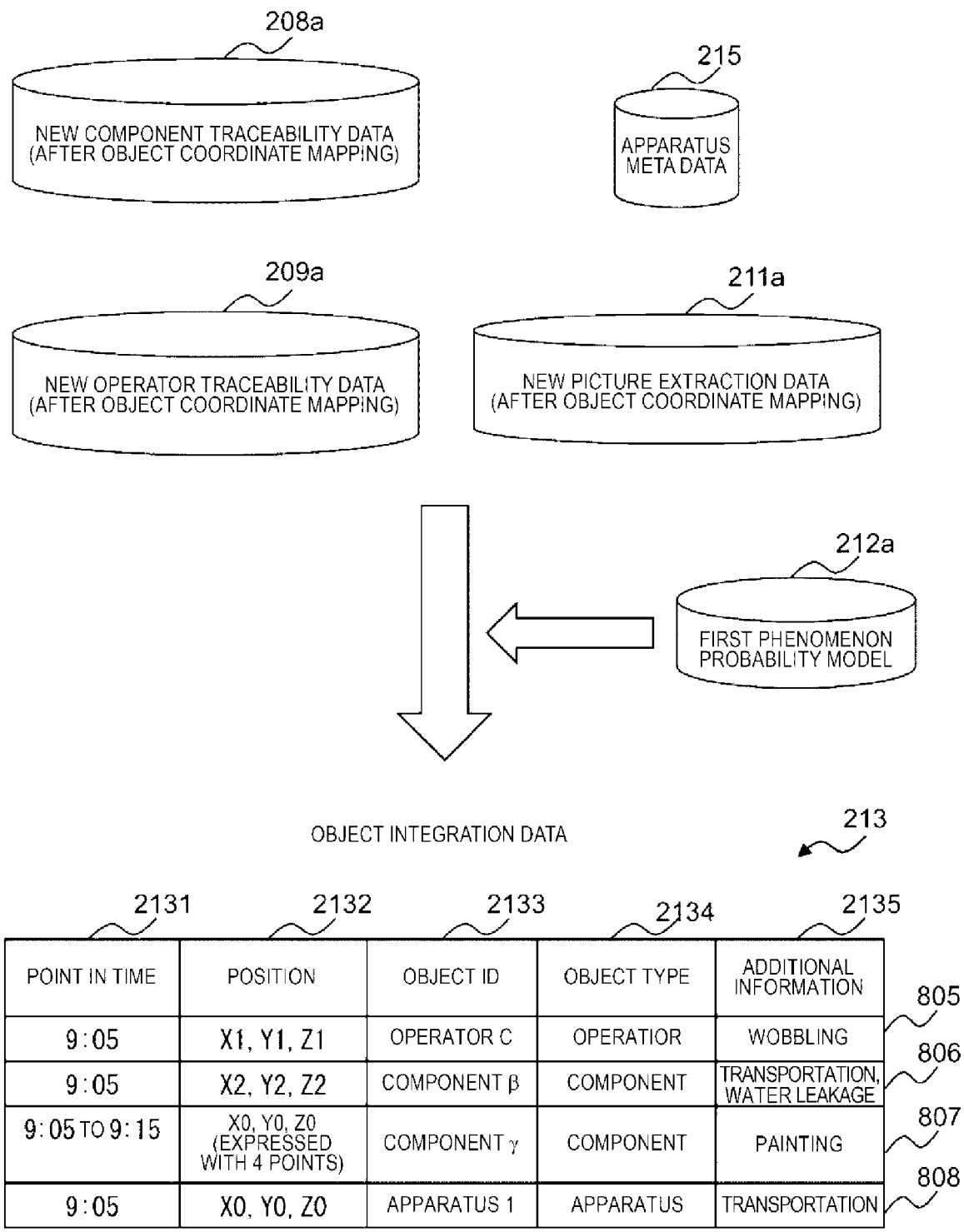
FIG. 19 is a diagram for describing an example of the same-object estimation processing.

Moreover, FIG. 19 is a diagram for describing an example of the same-object estimation processing. As illustrated in FIG. 19, the same-object estimation unit 206 generates object integration data relating to a component, based on the new component traceability data 208a, the new picture extraction data 211a, and the first phenomenon probability model 212a. Furthermore, the same-object estimation unit 206 generates object integration data relating to an operator, based on the new operator traceability data 209a, the new picture extraction data 211a, and the first phenomenon probability model 212a. Furthermore, the same-object estimation unit 206 generates object integration data relating to each apparatus, based on the apparatus metadata 215. Then, the same-object estimation unit 206 stores these generated pieces of object integration data in the object integration data 213.

For example, as illustrated in FIG. 15, in a case where, among records in the new component traceability data 208a, the record 406 in which point in time "9:00 to 9:10" and coordinates (X0, Y0, Z0) are stored is present and the record 407 in which point in time "9:05 to 9:15" and coordinates (X0, Y0, Z0) are stored is present, because "9:05" is stored under the point in time 2111 that is a field in the record 607 in the picture extraction data 211a, and coordinates (X2, Y2, Z2) (coordinates that are close to coordinates (X0, Y0, Z0)) are stored under position 2115, the same-object estimation unit 206 estimates that a component in the record 607 and a component in the record 406 are close to each other in terms of a point in time and a position (are at the same timing and at the same place).

At this point, coordinates in the record 406 is (X0, Y0, Z0). Then, a component in the record 803 in the first phenomenon probability model 212a, of which coordinates are (X0, Y0, Z0), is "component β" and has a phenomenon probability of "0.1". On the other hand, a component in the record 804 in the first phenomenon probability model 212a, of which coordinates are (X0, Y0, Z0), is "component γ" and has a phenomenon probability of "0.001". Therefore, the same-object estimation unit 206 estimates that component β has a higher phenomenon probability and that is in the record 803 is present at coordinates (X0, Y0, Z0). Next, a point in time in the record 607 in the first phenomenon probability model 212a is "9:05". Then, in the new operator traceability data 209a, the record 504 in which a point in time is "9:00 to 9:10" and coordinates are (X0, Y0, Z0) is present. Therefore, the same-object estimation unit 206 estimates that "operator C" that is shown in the record 504 is present at coordinates (X0, Y0, Z0) and at a point in time "9:05".

Subsequently, the same-object estimation unit 206 generates a new record 806 in the object integration data 213, stores "9:05" under a point in time 2131 that is a field in the generated record 806, stores (X0, Y0, Z0) under a position 2132, stores "component β" under an object ID 2133, stores "component" under an object type 2134, and stores "water leakage", which is under the operation state 2114 in the record 607 in the new picture extraction data 211a, and "transportation", which is under the processing detail 208b in the record 406 in the new component traceability data 208a, under an additional information 2135.

On the other hand, in the new operator traceability data 209a, the record 504 in which point in time "9:00 to 9:10" and coordinates "X0, Y0, Z0" are stored is present and in the picture extraction data 211a, the record 606 is present in which "9:05" is stored under the point in time 2111 and (X1, Y1, Z1) (coordinates that are close to (X0, Y0, Z0)) are stored under the position 2115. Accordingly, the same-object estimation unit 206 estimates that a component in the record 606 in the new picture extraction data 211a and an operator in the record 504 are close to each other in terms of a point in time and a position (are at the same timing and at the same place). In the new picture extraction data 211a, because at the point in time and the position, which are described above, a record relating to the operator is not present (not illustrated) in the other pieces of data, the same-object estimation unit 206 determines that "operator C" in the record 504" is an operator in the picture data 210, who is image-captured, and then generates a new record 805 in the object integration data 213, stores "9:05" under a point in time 2131 in the generated record 805, stores "X1, Y1, Z1" under the position 2132, stores "operator C" under an object ID 2133, and stores "wobbling" that is stored under the operation state 2114 in the record 606 in the new picture extraction data 211a, under an addition information 2135.

Furthermore, the same-object estimation unit 206 generates a new record 807 in the object integration data 213, and stores details that are in the record 407 in the new component traceability data 208a, under fields, respectively, in the generated record 807.

Furthermore, the same-object estimation unit 206 generates a new record 808 in the object integration data 213, and stores details that are in the record 408 in the apparatus metadata 215, under fields, respectively, in the generated record 808.

Object Integration Data Relevance Estimation Processing

Next, object integration data relevance estimation processing is described.

Figure 20:
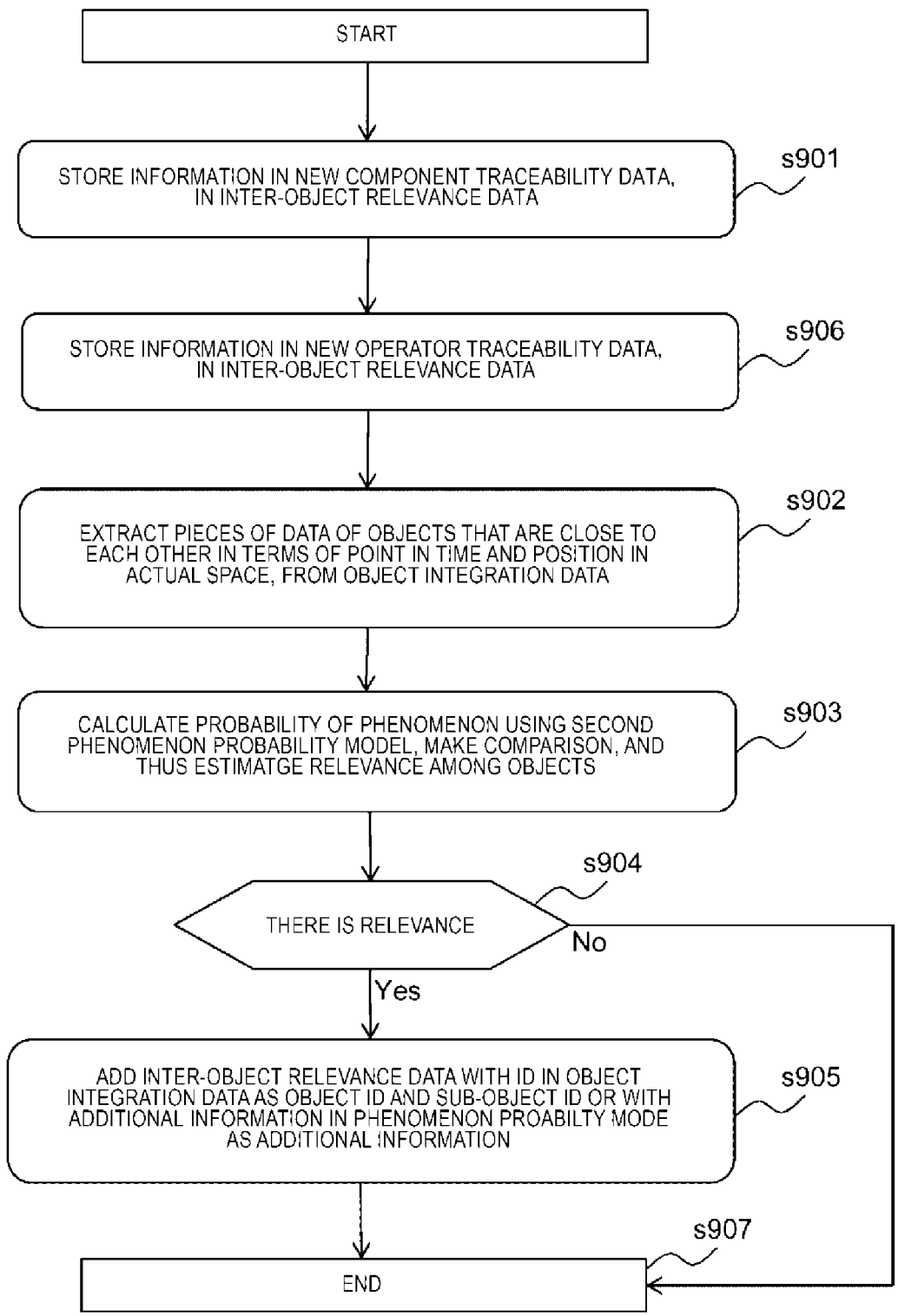
FIG. 20 is a flowchart for describing an example of object integration data relevance estimation processing.

FIG. 20 is a flowchart for describing an example of the object integration data relevance estimation processing. As illustrated in FIG. 20, the inter-object relevance estimation unit 207 stores contents of the new component traceability data 208a, in the inter-object relevance data 214 (s901). Furthermore, the inter-object relevance estimation unit 207 stores contents of the new operator traceability data 209a, in the inter-object relevance data 214 (s906).

Next, the inter-object relevance estimation unit 207 extracts records in which pieces of data of objects that are the same in terms of a point in time and a position (a position in an actual space) are recorded, referring to each record in the object integration data 213 (s902).

Then, the inter-object relevance estimation unit 207 estimates the relevance among the extracted objects that are extracted in s902, based on the second phenomenon probability model 212b (s903). In a case where it is estimated that the relevance is present among the objects (YES in s904), the inter-object relevance estimation unit 207 stores pieces of traceability information relating to the objects, among which the relevance is determined to be present, in the inter-object relevance data 214, along with predetermined information relating to processing of a component that is registered in the phenomenon probability model 212 (s905). On the other hand, in a case where it is estimated that the relevance among the objects is not present (NO in s904), inter-object relevance estimation processing is ended (s907).

Figure 21:
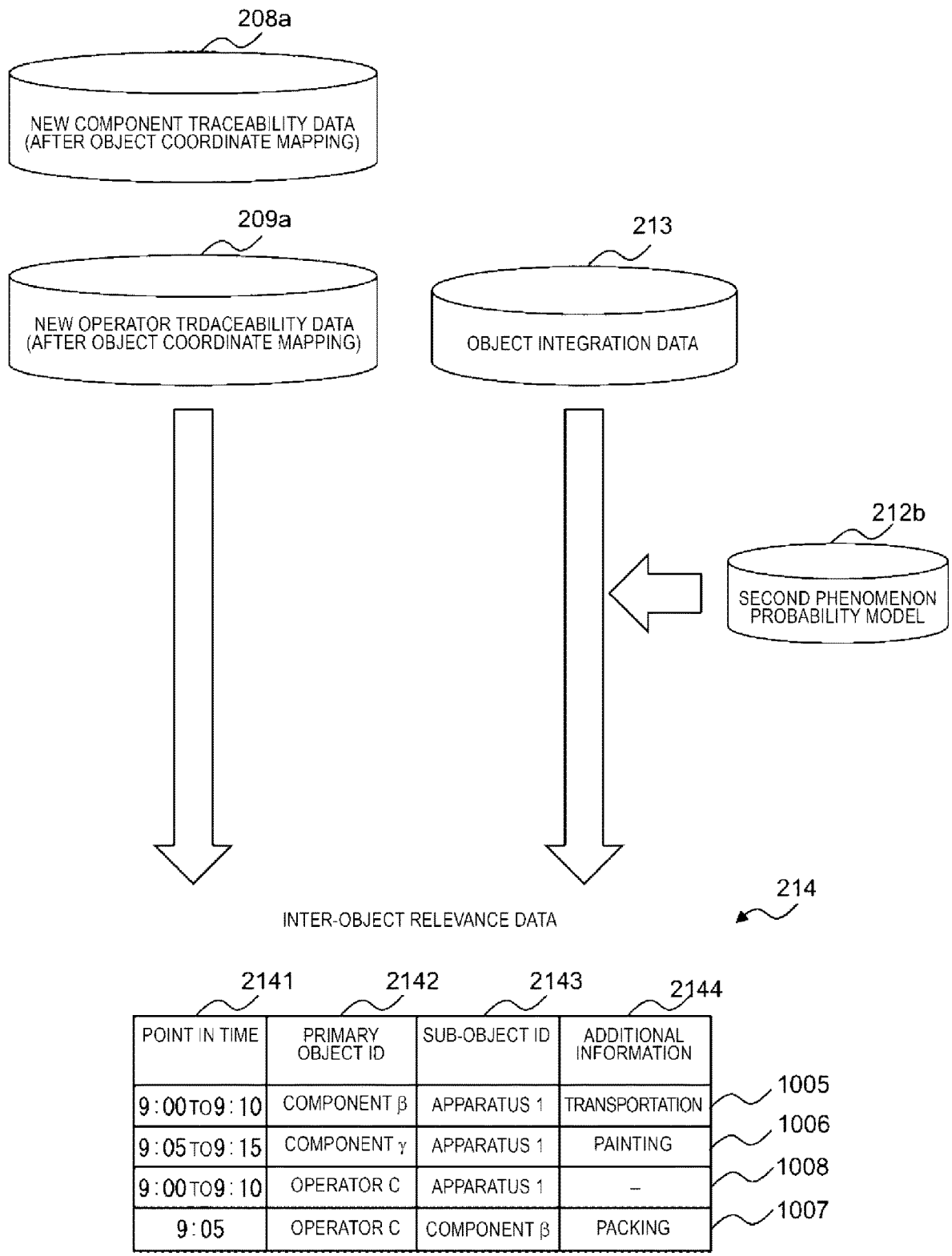
FIG. 21 is a diagram for describing an example of inter-object relevance estimation processing.

Moreover, FIG. 21 is a diagram for describing an example of the inter-object relevance estimation processing. The inter-object relevance estimation unit 207, as illustrated in FIG. 21, the contents of the new component traceability data 208a and the new operator traceability data 209a are stored in the inter-object relevance data 214. Furthermore, based on the second phenomenon probability model 212b, the inter-object relevance estimation unit 207 stores contents of the object integration data 213 in the inter-object relevance data 214.

Then, as illustrated in FIG. 21, the inter-object relevance data 214 is configured with at least one or more records, each of which has fields, that is, a point in time 2141 under which point-in-time information is stored, a primary object ID 2142 under which an object ID (a primary object ID) is stored, a sub-object ID 2143 under which an object ID (a sub-object ID) of an object other than an object under the primary object ID 2142 is stored, and an additional information 2144 under which information specifying a detail of processing that is performed by an object under the primary object ID 2142 and/or an object under the sub-object ID 2143 is stored.

In an example in FIG. 21, details in the record 406 in the new component traceability data 208*a* are stored in a record 1005 and a record 1006 in the inter-object relevance data 214. Furthermore, a detail in the record 504 in the new operator traceability data 209*a* is stored in a record 1008 in the inter-object relevance data 214.

The record 1008 is as follows. First, because a time span that includes "9:05" is stored under the point in time 2131 in any one of the record 805, the record 806, the record 807, and the record 808 in the object integration data 213, the inter-object relevance estimation unit 207 determines that these records are records regarding points in time which are close to each other (at the same timing). Furthermore, because positions, referred to as (X0, Y0, Z0), (X1, Y1, Z1), and (X2, Y2, Z2), which are adjacent to each other, are also stored under the positions 2132 in these records, the inter-object relevance estimation unit 207 determines that these records are records regarding positions which are adjacent to each other (at the same place).

At this point, the inter-object relevance estimation unit 207 acquires a combination of the record 805 and the record 806, and extracts "operator C" and "component β" that are objects in these acquired records. Then, the inter-object relevance estimation unit 207 checks that a combination of the objects, "operator C" and "component β" is stored in a record 1003 among records in the second phenomenon probability model 212*b*. Because a high probability of 0.1 (a probability that is higher than a predetermined threshold) is stored under the probability 2126 in the record 1003, the inter-object relevance estimation unit 207 generates a new record 1007 in the inter-object relevance data 214 and then stores "9:05" under the point in time in the generated record 1007, stores "operator C" under a primary object ID 2142, stores "component β" under a sub-object ID 2143, and stores "packing" that is a detail under the additional information 2125 in the record 1003, under an additional information 2144.

At this point, the inter-object relevance estimation unit 207 acquires a combination of the record 805 and the record 807, and extracts "operator C" and "component γ" that are objects in these acquired records. Then, the inter-object relevance estimation unit 207 checks that a combination of the objects, "operator C" and "component γ" is stored in a record 1004 among the records in the second phenomenon probability model 212*b*. However, because a low probability of "0.001" (a probability that is lower than a predetermined threshold) is stored under the probability 2126 in the record 1004, the inter-object relevance estimation unit 207, as opposed to the case described above, does not generate a record relating to "operator C" and "component β" in the inter-object relevance data 214.

It is noted that a record in which, if a combination of "operator C" and a component (an object) other than "component β" is recorded is not present in the second phenomenon probability model 212*b*, the inter-object relevance estimation unit 207 does not add a record relating to the combination to the inter-object relevance data 214.

Alert Processing

Next, the alert processing is described.

Figure 22:
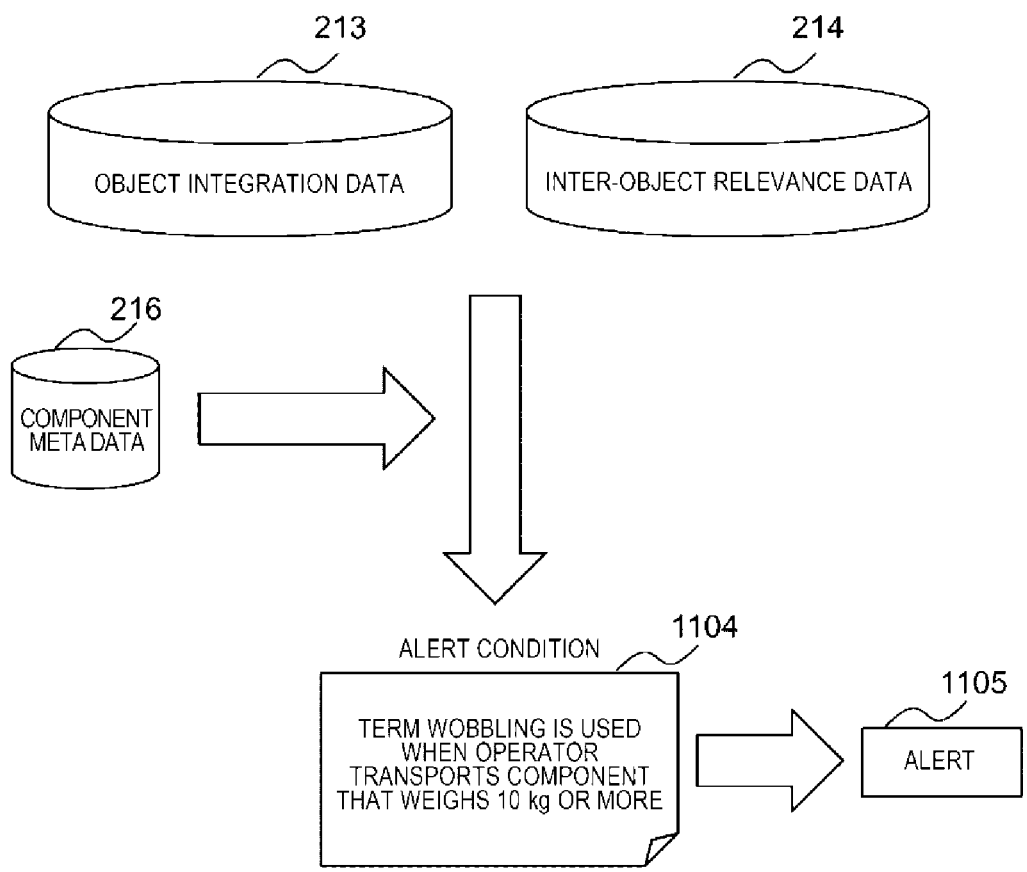
FIG. 22 is a diagram for describing an example of alert processing.

FIG. 22 is a diagram for describing an example of the alert processing. As illustrated in FIG. 22, based on the object integration data 213 and the inter-object relevance data 214, the alert processing outputs information of an object that is consistent with an alert condition 1104 relating to an object that is input in advance by the user, as an alert 1105.

For example, in a case where the alert condition 1104 is "the term wobbling is used when an operator transports a component that weighs 10 kg or more)", first, the alert processing unit 204 specifies the record 805 in which "operator" is stored under the object type 2134" and "wobbling" is stored under the additional information 2135, from the record in the object integration data 213, and acquires "operator C" that is stored under the object ID 2133 in the specified record 805. Next, the alert processing unit 204 specifies the record 1007 in which "operator C" is stored under the primary object ID 2142, from the record in the inter-object relevance data 214, and acquires "component β" that is a detail in the sub-object ID 2143 in the specified record 1007. Referring to the object integration data 213, the alert processing unit 204 checks that an object type of "component β" that is acquired in the above description is "component", and, then referring to the component metadata 216, acquires a weight ("10 kg") of "component β" that is acquired in the above description.

Then, because the acquired weight satisfies "10 kg or more" that is required by the alert condition 1104, the alert processing unit 204 outputs the alert 1105 to an output device of the manufacturing management server 108, the client node 106, or the like.

In this manner, the alert processing knows information of a component, an operator, or the like from the processing situation information and the traceability data, and issues an alert based on whether or not these pieces of information satisfy a predetermined condition (for example, whether or not an operating person wanders when the component that weighs 10 kg or more is transported). Because of this, it is possible that a defective product is prevented from being manufactured and that a cause of the defective product is earlier known, and quality of a product that is manufactured can be improved.

Search Processing

Next, the search processing is described.

Figure 23:
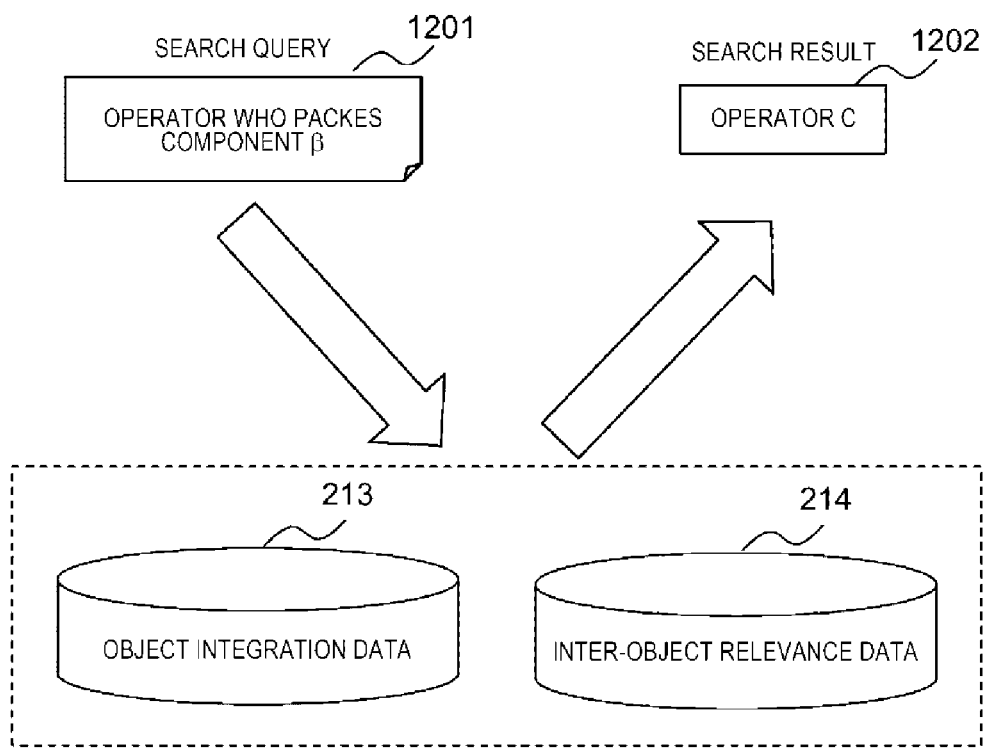
FIG. 23 is a diagram for describing an example of search processing.

FIG. 23 is a diagram for describing an example of the search processing. As illustrated in FIG. 23, based on the object integration data 213 and the inter-object relevance data 214, the search processing outputs information of an object that is consistent with a search query 1201 which is input in advance by the user, as a search result 1202.

For example, in a case where the search query 1201 is "an operator who packs component β", among records in the inter-object relevance data 214, the search unit 203 specifies the record 1007 in which "component β" is stored under the sub-object ID 2143, and in a case where "packing" is stored under the additional information 2144 in the specified record 1007, acquires "operator C" that is a detail under the primary object ID 2142 in the record 1007. Then, referring to the object integration data 213, the search unit 203 checks that an object type of "operator C" is "operator", and outputs information relating to "operator C", as the search result 1202.

Visualization Processing

Next, the visualization processing is described.

Figure 24:
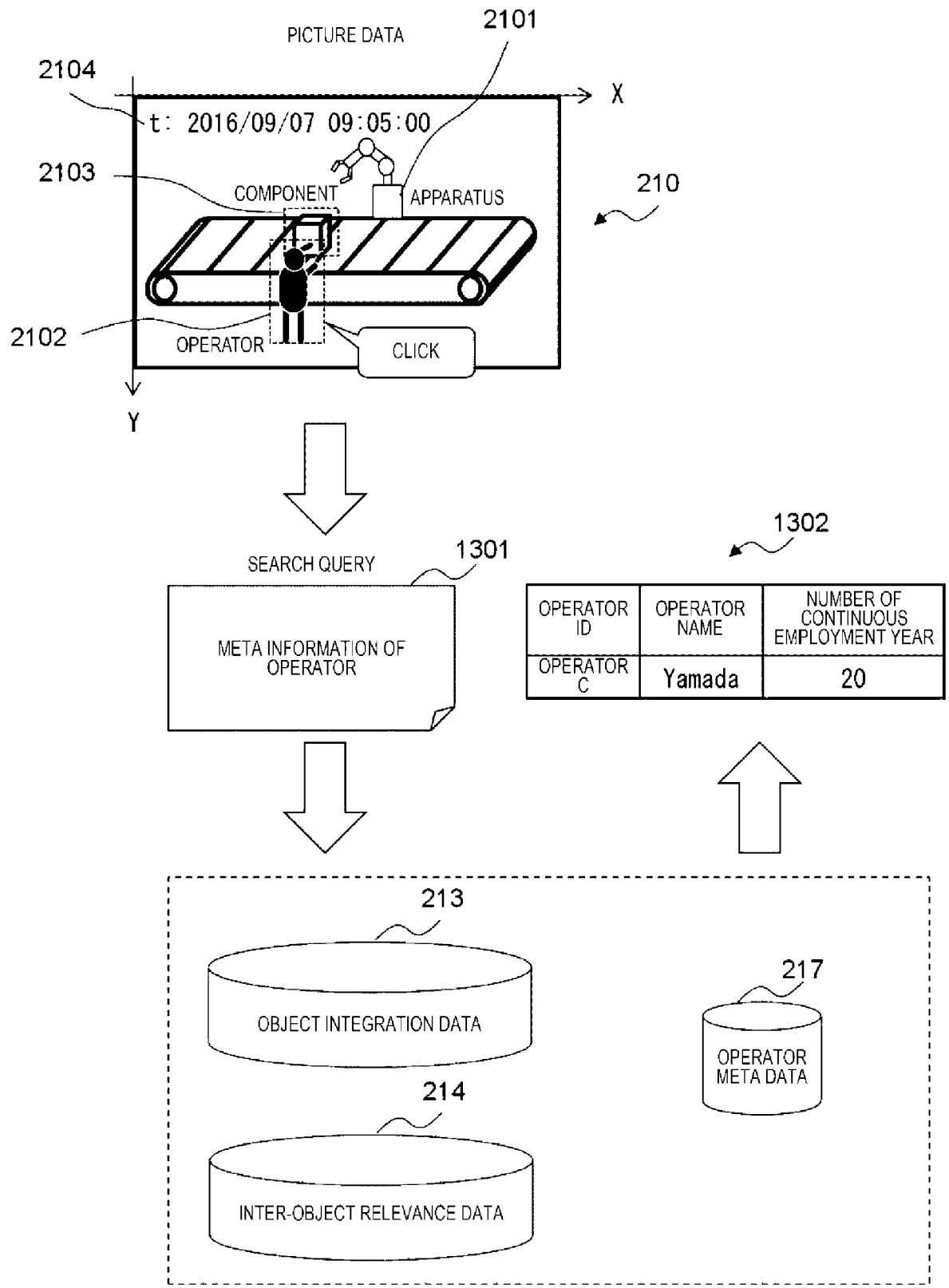
FIG. 24 is a diagram for describing an example of visualization processing.

FIG. 24 is a diagram for describing an example of the visualization processing. As illustrated in FIG. 24, the visualization unit 201 outputs the picture data 210 including each object image-captured, to an output device, and receives an assignment (input) of the object by the user with respect to the picture data 210 which is output. Then, the visualization unit 201 outputs the object that is assigned and information associated with the object.

For example, in a case where the user performs assigning of a certain operating person 2102 (hereinafter referred to as an assigned operating person in the present paragraph) on a screen of an output device to which the picture data 210 that is image-captured at a position (X1, Y1, Z1) in an actual space at point in time "9:05" is output, (for example, in a case where the assigning is performed on a touch panel screen), the visualization unit 201 specifies the record 805 in which information of the assigned operating person is stored, from the record in the object integration data 213. Then, the visualization unit 201 acquires "operator C" that is present under the object ID 2133 in the specified record 805, and acquires information (operator name "Yamada", and the number of continuous employment years "20") of an attribute of "operator C" that is acquired, from a record 1309 in the operator metadata 217. Then, the visualization unit 201 outputs the information of the acquired attribute to the output device of the manufacturing management server 108, the client node 106, or the like.

In this manner, with the visualization processing, the user can easily know information associated with the assigned object.

Analysis Processing

Next, the analysis processing is described.

Figure 25:
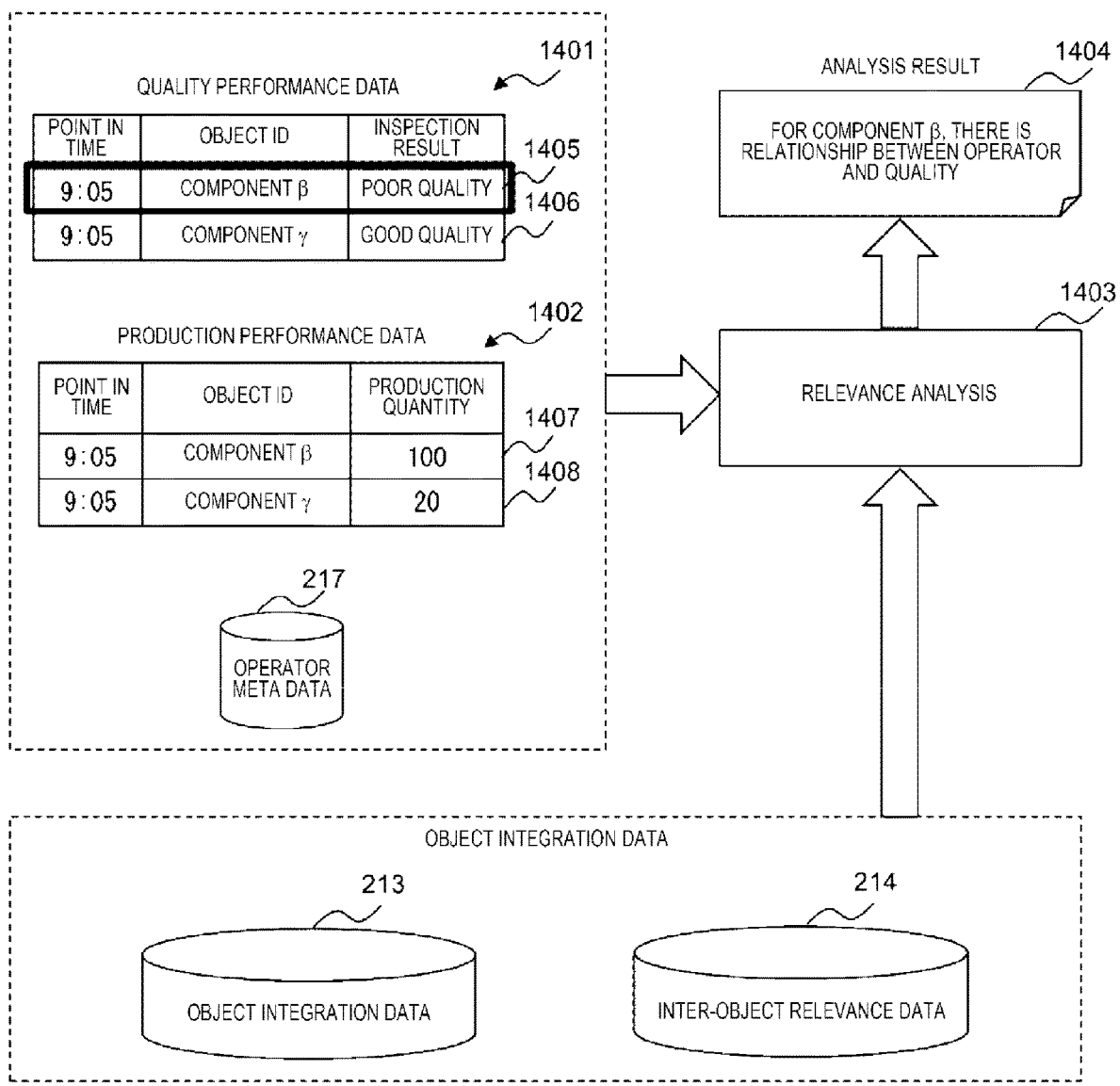
FIG. 25 is a diagram for describing an example of analysis processing.

FIG. 25 is a diagram for describing an example of the analysis processing. As illustrated in FIG. 25, the analysis unit 202 performs relevance analysis 1403 relating to relevance among predetermined objects, based on information relating to component performance, which is referred to as quality performance data 1401 in which a performance value relating to component quality is stored, or production performance data 1402 in which performance values relating to a production quantity of components are stored, and information relating to an object, which is referred to as the object integration data 213 or the inter-object relevance data 214, and outputs a result of the relevance analysis.

For example, in a case where an assignment for analyzing relevance between the component quality and the operator is input from the user, as illustrated in FIG. 25, the analysis unit 202 specifies a record 1405 (a record for "component β") in which a component, a result of which quality inspection is "poor quality", is recorded, from a record in the quality performance data 1401, and then acquires the record 1007 in which an object ID of "component β" in the record 1405 is stored under the sub-object ID 2143, for a record in the inter-object relevance data 214. Next, the analysis unit 202 acquires "operator C" that is stored under the primary object ID 2142 in the acquired record 1007. Then, the analysis unit 202 performs the relevance analysis 1403 based on these acquired pieces of information. Then, the analysis unit 202 generates an analysis result 1404 showing that "operator C" is likely to cause "poor quality" of product in a case where "operator C" is in charge of "component β", and outputs the generated analysis result 1404 to the output device, of the manufacturing management server 108, the client node 106, or the like.

In this manner, because the analysis processing estimates the relevance among the objects and outputs a result of the estimation, the user can precisely know a relationship among the objectors. Accordingly, for example, because the operator who is associated with the component that has poor quality can be specified, a cause of the poor quality of each component can be investigated, and thus can accomplish an improvement in efficiency of product production.

As described above, the manufacturing management system 1 according to the present embodiment generates a combination at the same timing, of processing, an apparatus or an operating person, and a situation of processing, as the object integration data, based on the traceability information that results from associating a component, an apparatus, an operating person, and a timing at which processing is performed, with each other, and the processing situation information, and outputs contents of the generated object integration data. Because of this, the user can precisely know not only a history relating to the processing of the component or the operating person, but also a situation that occurs when these processing operations are performed. Accordingly, the traceability can be improved in a production manufacturing line. For example, because it can precisely be known easily and precisely that which operator performs which processing on a component of a product, the traceability is improved in the manufacturing line.

Furthermore, in the manufacturing management system 1 according to the present embodiment, the traceability information is information including a position at which processing by an apparatus is performed and a position of an operating person who is in charge of a component, and based on this information, the combination at the same timing and at the same place is generated as the object integration data. Because of this, situations of processing operations that are performed at different positions can precisely be known.

Furthermore, the manufacturing management system 1 according to the present embodiment generates the object integration data based on a first phenomenon probability model relating to a probability that a combination of an operating person and a component of which the operating person is in charge will occur at the same timing, and because of this, can generate the object integration data in which a situation of processing is precisely reflected. Accordingly, the accuracy of the traceability in the product manufacturing line can be improved.

Furthermore, in the manufacturing management system 1 according to the present embodiment, because the processing situation information includes information of an image that results from image-capturing a situation of an operation that is performed in a process, an operation of an operator or a situation of a process can be known easily and concretely.

Furthermore, the manufacturing management system 1 according to the first embodiment acquires a plurality of pieces of object integration data, estimates relevance among the acquired pieces of object integration data, and outputs information indicating the estimated relevance. Because of this, the user can precisely know relationships among a plurality of objects that are associated with each other. Accordingly, the accuracy of the traceability in the product manufacturing line can be improved.

Furthermore, the manufacturing management system 1 according to the present embodiment estimates the relevance among the object integration data based on the second phenomenon probability model relating to a probability that a combination of a situation of processing, and an operator or a component will occur at the same timing. Because of this, the relevance among the objects can be precisely estimated. Accordingly, the accuracy of the traceability in the product manufacturing line can be improved.

Furthermore, in the manufacturing management system 1 according to the present embodiment, the processing situation information includes the information of the image that results from image-capturing the situation of the processing. Because of this, the situation of the processing of the component by the apparatus can be precisely known.

Second Embodiment

A manufacturing management system according to a second embodiment will be described below using diagrams. At this point, in the manufacturing management system according to the second embodiment, the processing situation information includes information relating to any one of sound, temperature, smell, a speed of a person or a thing, a wind speed, and atmospheric pressure that occur in association with the processing of the component. In the present embodiment, the processing situation information is referred to as environment sensing information.

What distinguishes the manufacturing management system according to the second embodiment from the manufacturing management system according to the first embodiment will be described below.

Apparatus Configuration

Figure 26:
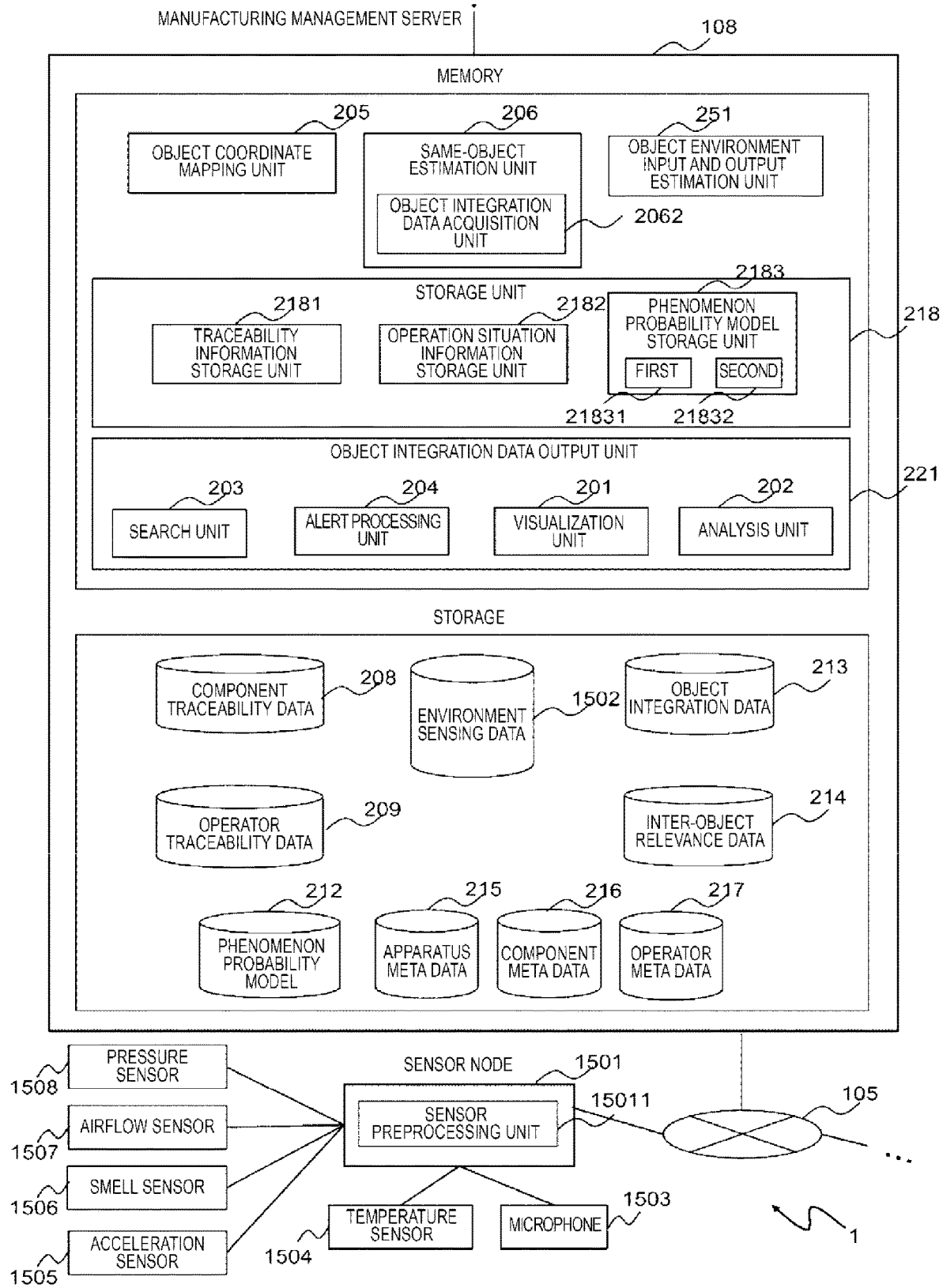
FIG. 26 is a diagram for describing an example of a configuration of a manufacturing management system according to a second embodiment.

FIG. 26 is a diagram for describing an example of a configuration of a manufacturing management system 1 according to the second embodiment. As illustrated in FIG. 26, the manufacturing management system 1 according to the present embodiment includes sensor node 1501 instead of the camera node 109 according to the first embodiment.

The sensor node 1501 is connected to each node that acquires environment sensing information, instead of the camera 112 according to the first embodiment. That is, the sensor node 1501 is connected to a microphone 1503 that acquires audio information, a temperature sensor 1504 that acquires temperature information, an acceleration sensor 1505 that acquires acceleration of an object, a smell sensor 1506 that acquires information relating to a smell in the ambient air, an airflow sensor 1507 that acquires information including wind-direction, air flow or the like, and an atmospheric pressure sensor 1508 that acquires an outside air pressure (which are hereinafter collectively referred to as a sensor group), in a manner that makes communication possible. The sensor group is provided in the vicinity of an apparatus that processes each component or in a place where each operating person performs an operation.

Functions

The sensor node 1501 includes a sensor preprocessing unit 15011 to perform a function thereof. The sensor preprocessing unit 15011 receives the environment sensing information that is acquired by the sensor group and transmits the received environment sensing information to the manufacturing management server 108.

Furthermore, the manufacturing management server 108 according to the second embodiment stores environment sensing data 1502, instead of the picture data 210 and the picture extraction data 211 according to the first embodiment.

Figure 27:
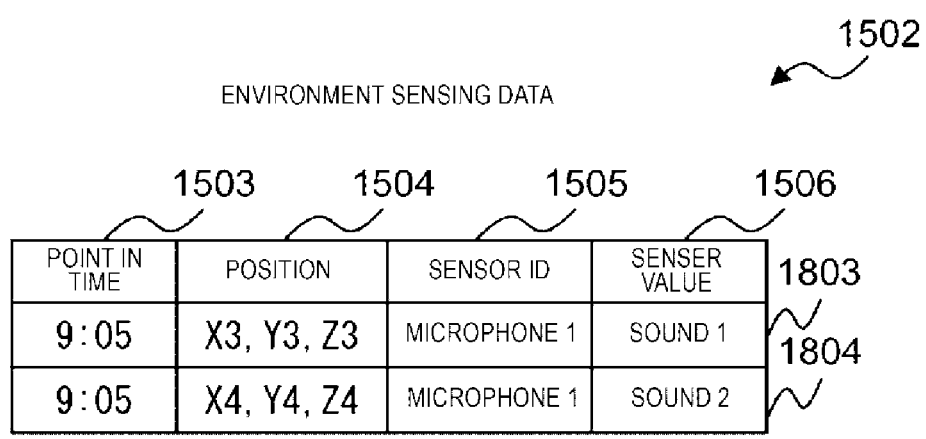
FIG. 27 is a diagram illustrating an example of environment sensing data.

At this point, FIG. 27 is a diagram illustrating an example of the environment sensing data 1502. As illustrated in FIG. 27, the environment sensing data 1502 is configured with one or more records, each of which has fields, that is, a position 1504 under which information specifying a position at which the environment sensing information is acquired is stored, a sensor ID 1505 under which information (hereinafter referred to as a sensor ID) identifying an apparatus (a sensor) that acquires the environment sensing information is stored, a sensor value 1506 under which a value indicated by the environment sensing information that is acquired by a sensor with the sensor ID 1505 is stored, and a point in time 1503 under which information specifying a point in time at which a value under the sensor value 1506 is acquired is stored.

Next, as illustrated in FIG. 26, the manufacturing management server 108 according to the second embodiment includes an object environment input and output estimation unit 251 instead of the inter-object relevance estimation unit 207 according to the first embodiment.

Based on the traceability information and the environment sensing information, the object environment input and output estimation unit 251 generates a combination at the same timing, of processing, an apparatus or an operating person, and a situation of processing, as the object integration data.

Processing

Processing that is different from that by the manufacturing management system 1 according to the first embodiment will be described below.

Same-Object Estimation Processing

First, a same-object estimation processing according to the second embodiment, which is performed by the same-object estimation unit 206, is described.

Figure 28:
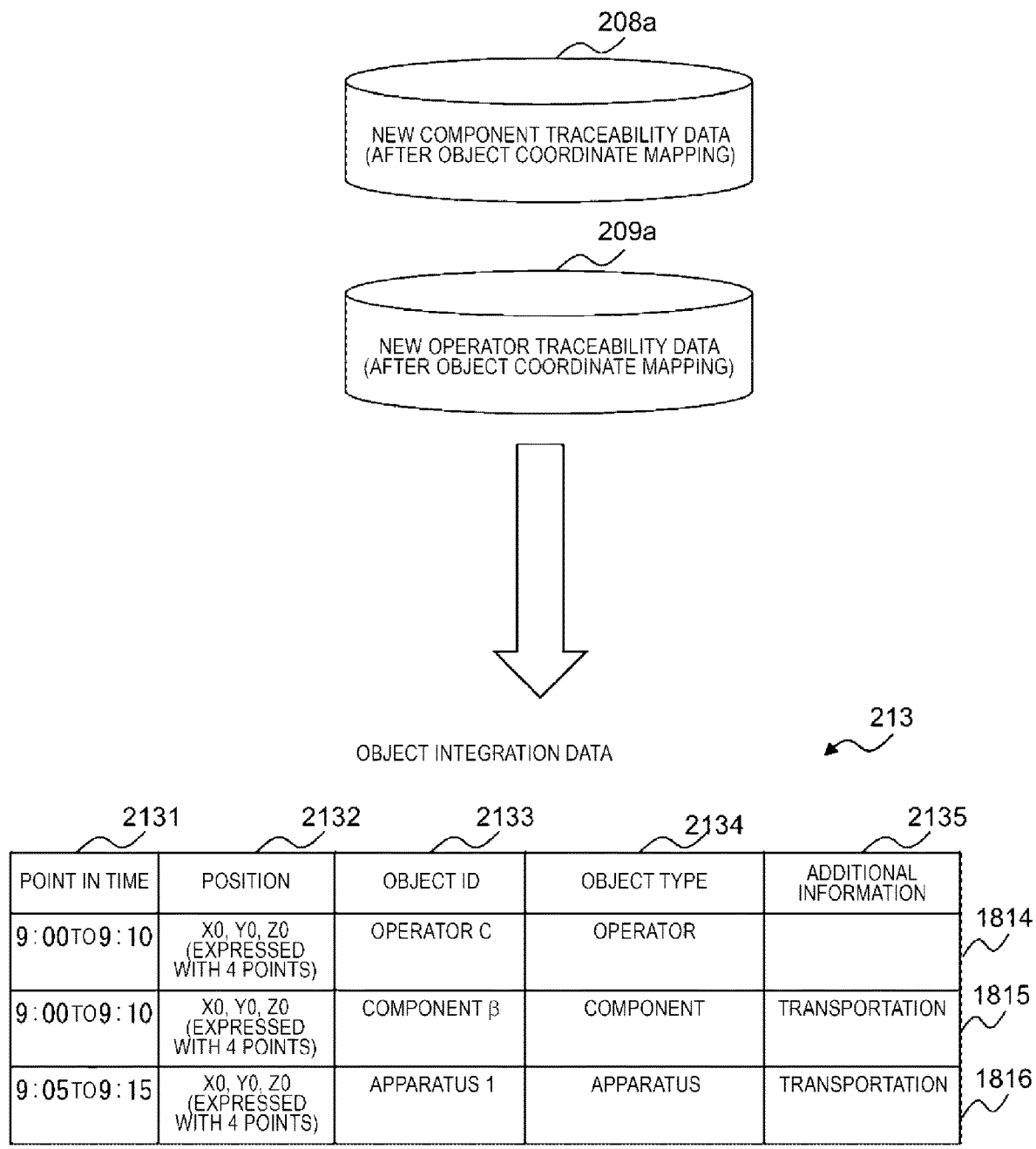
FIG. 28 is a diagram for describing an example of same-object estimation processing according to the second embodiment.

FIG. 28 is a diagram for describing an example of the same-object estimation processing according to the second embodiment. As illustrated in FIG. 28, based on the new component traceability data 208a and the new operator traceability data 209a, the same-object estimation unit 206 generates the object integration data 213.

For example, a case is assumed where, as illustrated in FIG. 4, among records in the new component traceability data 208a, the record 406 in which point in time 9:00 to 9:10 and coordinates (X0, Y0, Z0) are stored is present and where, as illustrated in FIG. 5, among records in the new operator traceability data 209a, the record 504 in which point in time "9:00 to 9:10" and coordinates (X0, Y0, Z0) are stored is present.

In this case, the same-object estimation unit 206 estimates that points in time and positions in the record 406 and the record 504 are close to each other (at the same timing and at the same place), generates new record 1814 and record 1815 in the object integration data 213, and stores the details that are in the record 406 and the record 504, in the generated record 1814 and the record 1815, respectively.

On the other hand, when it comes to the record 407 in the new component traceability data 208a, in which a point in time is "9:05 to 9:15" and coordinates are (X0, Y0, Z0), a record (that is to say a point in time and a position are close to a point in time and position in the record 407) in the new operator traceability data 209a, which corresponds to the record 407, is not present.

Accordingly, the same-object estimation unit 206 generates a new record 1816 in the object integration data 213, and stores a detail that is in the record 407 in the new component traceability data 208a, in the generated record 1816.

Object Environment Input and Output Estimation Processing

Next, processing (hereinafter referred to as an object environment input and output estimation processing) that is performed by the object environment input and output estimation unit 251 is described.

Figure 29:
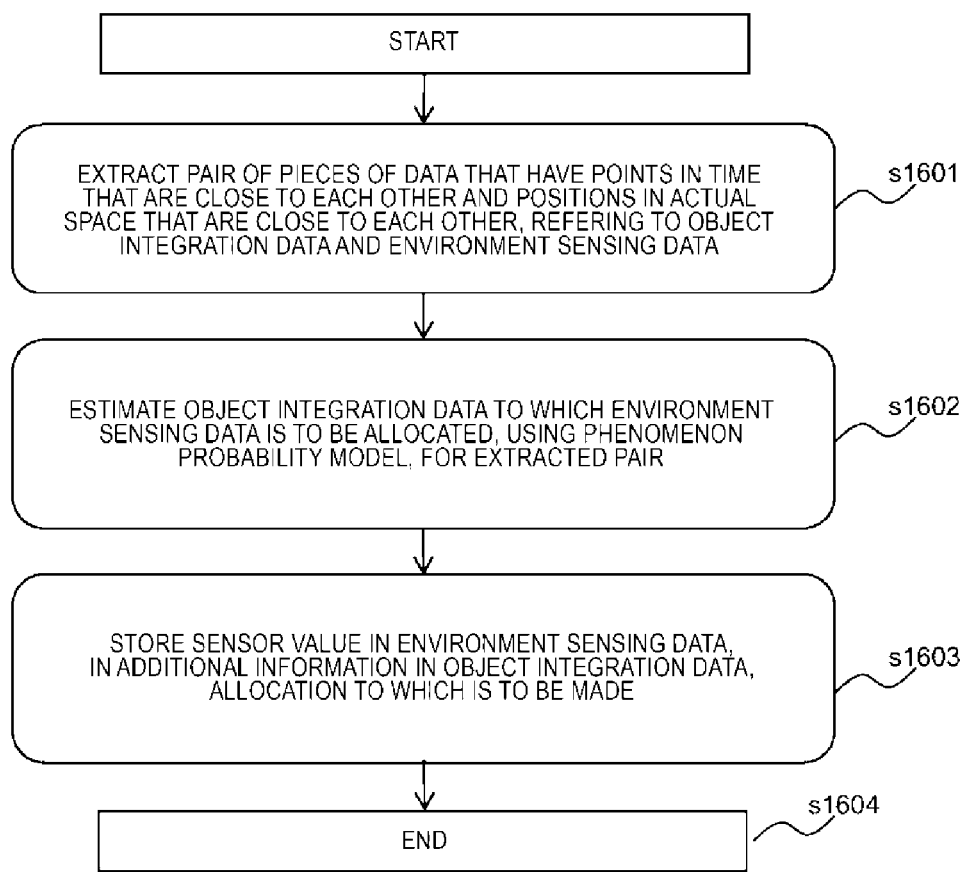
FIG. 29 is a diagram for describing an example of object environment input and output estimation processing.

FIG. 29 is a diagram for describing an example of the object environment input and output estimation processing. As illustrated in FIG. 29, referring to records in each of the object integration data 213 and environment sensing data 1502, the object environment input and output estimation unit 251 extracts a record in the object integration data 213 and a record in the environment sensing data 1502, which have the same point in time and the same position (which have the same timing and the same place) (s1601).

Then, the object environment input and output estimation unit 251 estimates relevance between the two records that are extracted in s1601, based on the phenomenon probability model 212 (s1602). Then, the inter-object relevance estimation unit 207 appends a detail of a record in the environment sensing data 1502 to a record in the object integration data 213 (s1603). The object environment input and output estimation processing ends with the above processing (s1604).

Figure 30:
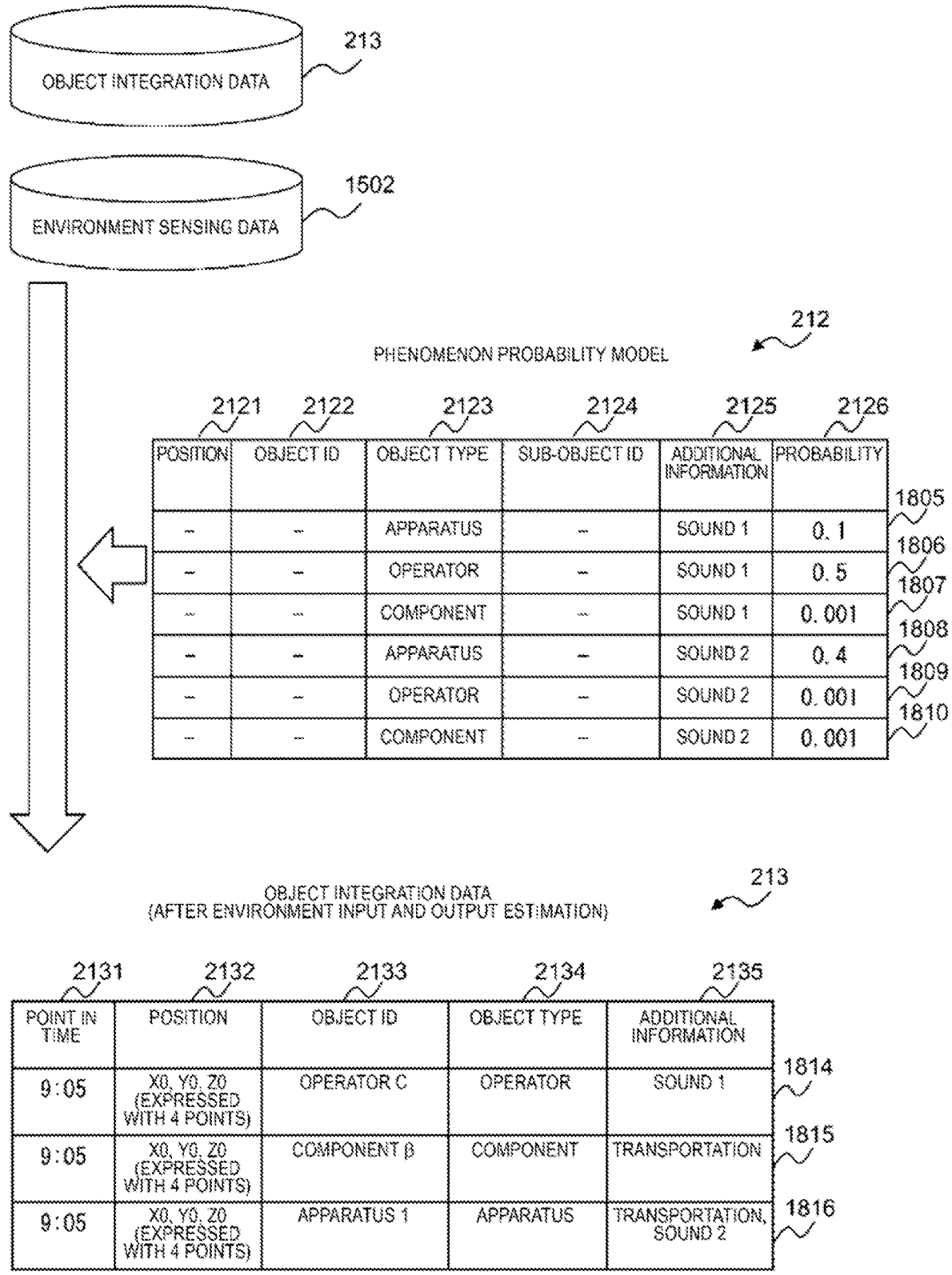
FIG. 30 is a diagram for describing an example of the object environment input and output estimation processing.

Moreover, FIG. 30 is a diagram for describing an example of the object environment input and output estimation processing. As illustrated in FIG. 30, based on the object integration data 213 and the environment sensing data 1502, referring to the phenomenon probability model 212, the object environment input and output estimation processing generates a new object integration data 213 (which results from update).

For example, a case is assumed where, as illustrated in FIG. 28, "9:00 to 9:15" is stored under the point in time 2131 in the record 1814 in the object integration data 213, stores (X0, Y0, Z0) under the position 2132, and where, as illustrated in FIG. 27, "9:05" is stored under the point in time 1503 in the record 1803 in the environment sensing data 1502 and coordinates (X3, Y3, Z3) (coordinates (X3, Y3, Z3) are close to coordinates (X0, Y0, Z0)) is stored under the position 1504.

In this case, the object environment input and output estimation unit 251 estimates that the record 1814 and the record 1803 have the points in time that are close to each other and the positions that are close to each other (have the same timing and the same place).

Then, the object environment input and output estimation unit 251 refers to the phenomenon probability model 212. In the phenomenon probability model 212 according to the present embodiment, information is stored under each of the fields, that is, the object type 2123, the additional information 2125, and the probability 2126.

At this point, "sound 1" is stored under the sensor value 1506 in the record 1803 in the environment sensing data 1502, and records in the phenomenon probability model 212, in each of which "sound 1" is correspondingly stored under the additional information 2125, are a record 1805, a record 1805, a record 1806, and a record 1807. Then, among these records, a record in which the highest phenomenon probability (0.5) is stored under the probability 2126 is the record 1805, and because of this, the object environment input and output estimation unit 251 acquires "operator" as an object type, referring to the object type 2123 in the record 1805.

Then, the object environment input and output estimation unit 251 checks that the acquired object type ("operator") is consistent with a detail in the object type 2134 in the record 1814 in the object integration data 213, and then appends "sound 1", which is described above, to the additional information 2125 in the record 1814 in the object integration data 213.

With the processing that is the same as this, the object environment input and output estimation unit 251 appends "sound 2" to the record 1816 in the object integration data 213 and to the sensor value 1506 in the record 1804 in the environment sensing data 1502, and based on the record 1808 in the phenomenon probability model 212, appends "sound 2", which is described above, to the additional information 2125 in the record 1816 in the object integration data 213.

It is noted that when it comes to the record 1815 in the object integration data 213, because a record in the environment sensing data 1502, which has a point in time and a position which are close to a point in time and a position, respectively, in the record 1815, is not present, the object environment input and output estimation unit 251 does not append the environment sensing information to the additional information 2125 in the record 251.

Alert Processing

Next, the alert processing is described.

Figure 31:
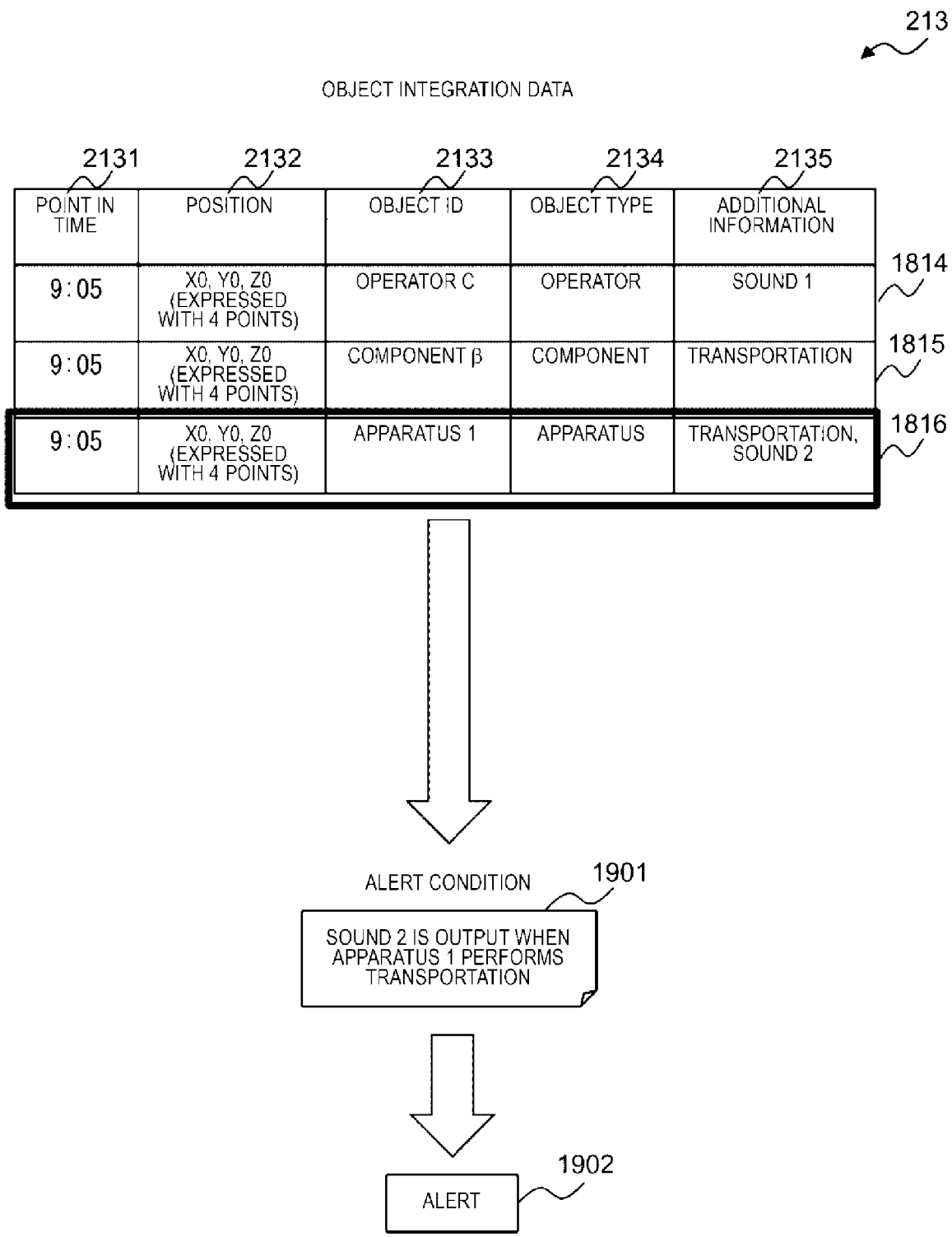
FIG. 31 is a diagram for describing alert processing according to the second embodiment.

FIG. 31 is a diagram for describing alert processing according to the second embodiment. As illustrated in FIG. 31, the alert processing searches for information of an object that is consistent with an alert condition 1901 relating to an object that is input in advance from the user, based on the object integration data 213, and outputs an alert 1902 (for example, a predetermined message or sound).

For example, in a case where the alert condition 1901 is "when apparatus 1 performs the transportation, sound 2 is output", first, among records in the object integration data 213, the alert processing unit 204 searches for a record in which "sound 2" is stored under the additional information 2135, and "apparatus" is stored under the object type 2134, specifies the corresponding record 1816, and acquires "apparatus 1" that is stored under the object ID 2133 in the specified record 1816.

Then, the alert processing unit 204 determines that a situation of the object satisfies the condition that is dictated by the alert condition 1901, and outputs an alert 1902 to that effect, to the output device of the manufacturing management server 108, the client node 106, or the like.

In this manner, because the alert processing issues an alert in a case where a situation (for example, a situation of processing of a component, which is known by the environment sensing information) of processing relating to an object) satisfies a predetermined condition, the user can easily discover or predict poor quality of a component or a product. Accordingly, for example, it is possible that a poor-quality product is prevented from being manufactured or that a cause of the poor-quality product is early known. Consequently, the quality of products can be improved.

Third Embodiment

A manufacturing management system according to a third embodiment will be described below with reference to the drawings. The manufacturing management system according to the third embodiment uses a plurality of pieces of processing situation information without using the traceability data. Specifically, the image data that is described in the first embodiment and the environment sensing information that is described in the second embodiment are used. Differences with the first embodiment and the second embodiment will be described below in a focused manner.

Apparatus Configuration

Figure 32:
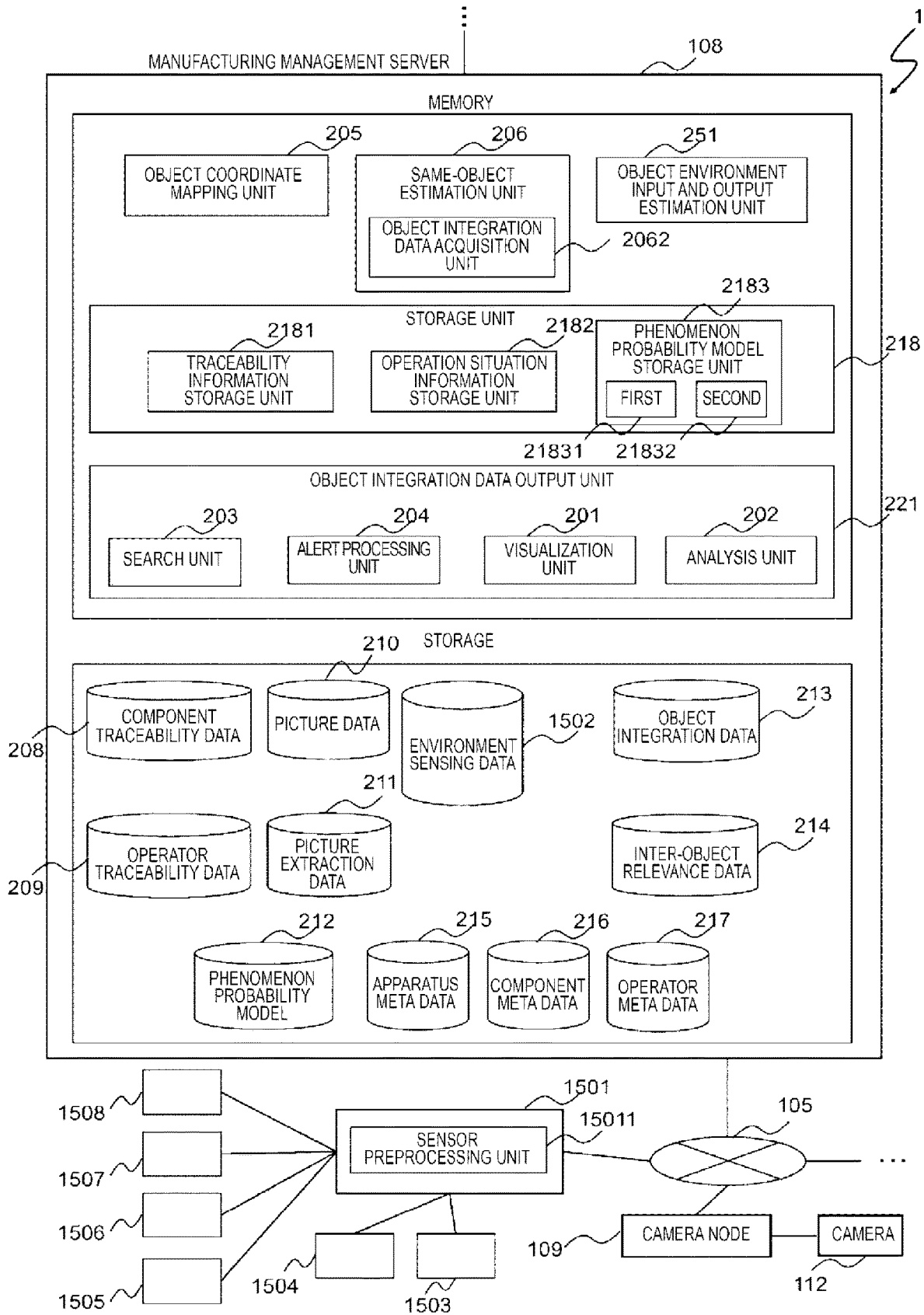
FIG. 32 is a diagram for describing an example of a configuration of a manufacturing management system according to a third embodiment.

FIG. 32 is a diagram for describing an example of a configuration of the manufacturing management system 1 according to the third embodiment. As illustrated in FIG. 32, the manufacturing management system 1 according to the present embodiment includes the camera node 109 and the camera 112 according to the first embodiment, and the sensor node 1501 and the sensor group according to the second embodiment. It is noted that the other apparatuses are the same as those in the first embodiment.

Functions

The manufacturing management server 108 according to the present embodiment stores the picture data 210 and the picture extraction data 211 according to the first embodiment, and the environment sensing data 1502 according to the second embodiment. It is noted that the other pieces of data are the same as those in the first embodiment. The component traceability data 208 and the operator traceability data 209 according to the first embodiment are not present.

Furthermore, the manufacturing management server 108 according to the present embodiment includes both the inter-object relevance estimation unit 207 according to the first embodiment and the object environment input and output estimation unit 251 according to the second embodiment. It is noted that the other functions are the same as those in the first embodiment.

Processing

Same-Object Estimation Processing and Environment Input and Output Estimation Processing Next, same-object estimation processing and environment input and output estimation processing according to the present embodiment are described.

Figure 33:
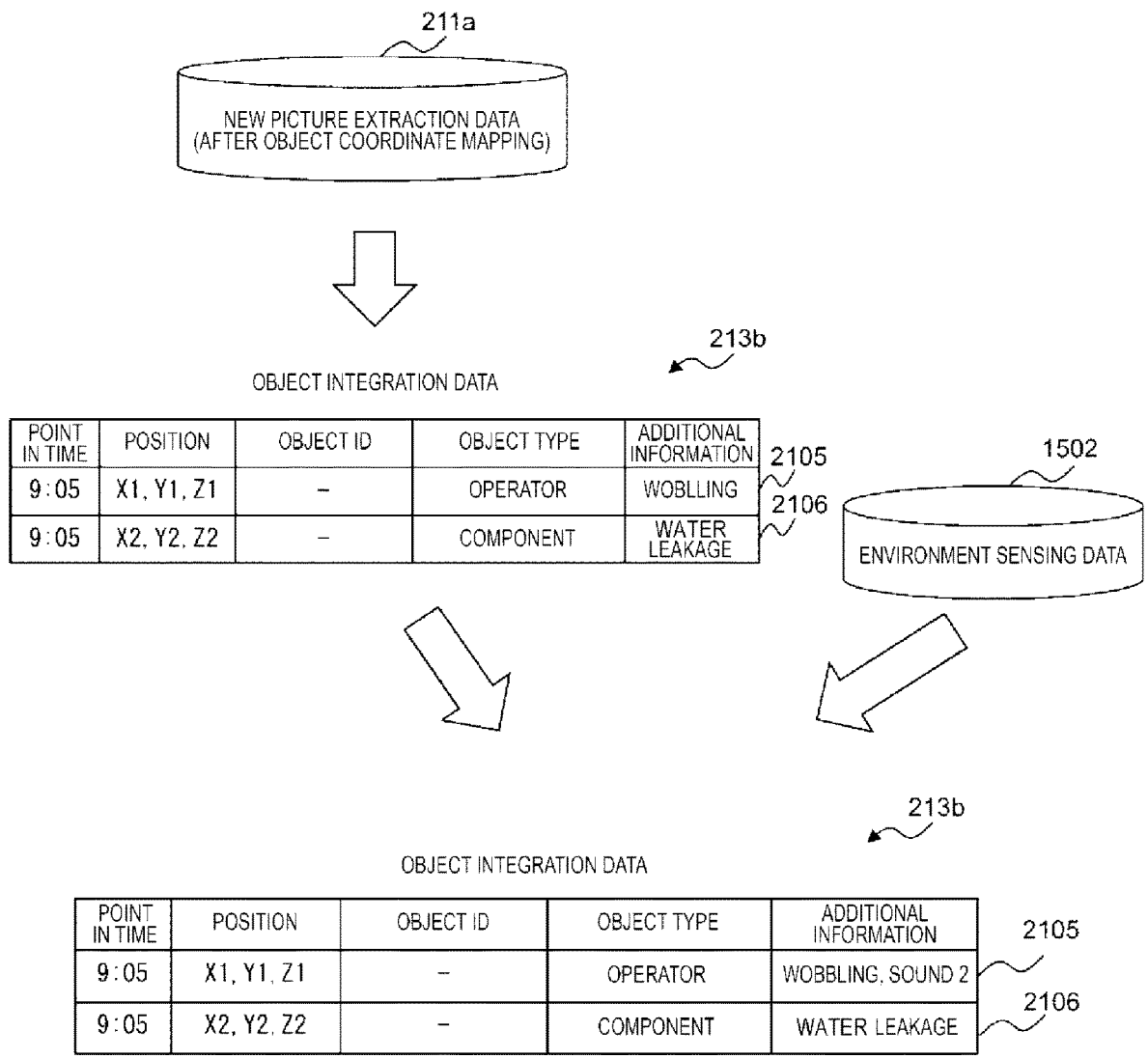
FIG. 33 is a diagram for describing same-object estimation processing and environment input and output estimation processing according to the third embodiment.

FIG. 33 is a diagram for describing the same-object estimation processing and the environment input and output estimation processing according to the present embodiment. As illustrated in FIG. 33, in the third embodiment, based on the new picture extraction data 211a, the object integration data 213b is generated. Furthermore, based on the generated object integration data 213b and the environment sensing data 1502, the object integration data 213b (which results from the update) is generated.

For example, a case is assumed where, as illustrated in FIG. 17, "9:05" is stored under the point in time 2111 in the record 606 in the new picture extraction data 211a, stores (X1, Y1, Z1) under the position 2115, and where, as illustrated in FIG. 27, "9:05" is stored under the point in time 1503 in the record 1803 in the environment sensing data 1502, coordinates (X3, Y3, Z3) (coordinates (X3, Y3, Z3) are close to coordinates (X1, Y1, Z1)) are stored under the position 1504, and "sound 1" is stored under the sensor value 1506.

In this case, because the record 606 and the record 1803 have the same point in time and the same place (have the same timing and the same place), as illustrated in FIG. 33, "9:05" is stored under the point in time 2131 in the record 2105 in the generated object integration data 213b, based on the record 606 in the new picture extraction data 211a, and (X1, Y1, Z1) is stored under the position 2132. Then, "sound 1" under the sensor value 1506 in the record 1803 in the environment sensing data 1502 is appended to the additional information 2135 in the record 2105.

On the other hand, a case is assumed where, as illustrated in FIG. 17, "9:05" is stored under the point in time 2111 in the record 607 in the new picture extraction data 211a, coordinates (X2, Y2, Z2) are stored under the position 2115, and where, as illustrated in FIG. 27, "9:05" is stored under the point in time 1503 in the record 1804 in the environment sensing data 1502, coordinates (X4, Y4, Z4) (coordinates (X4, Y4, Z4) are not close to coordinates (X1, Y1, Z1)) are stored under the position 1504, and "sound 2" is stored under the sensor value 1506.

In this case, because the record 607 and the record 1804 do not have the same point in time or the same place (do not have the same timing or the same place), as illustrated in FIG. 33, "sound 2" is not appended to the record 2106 in the object integration data 213b.

Visualization Processing

Next, visualization processing according to the present embodiment is described.

Figure 34:
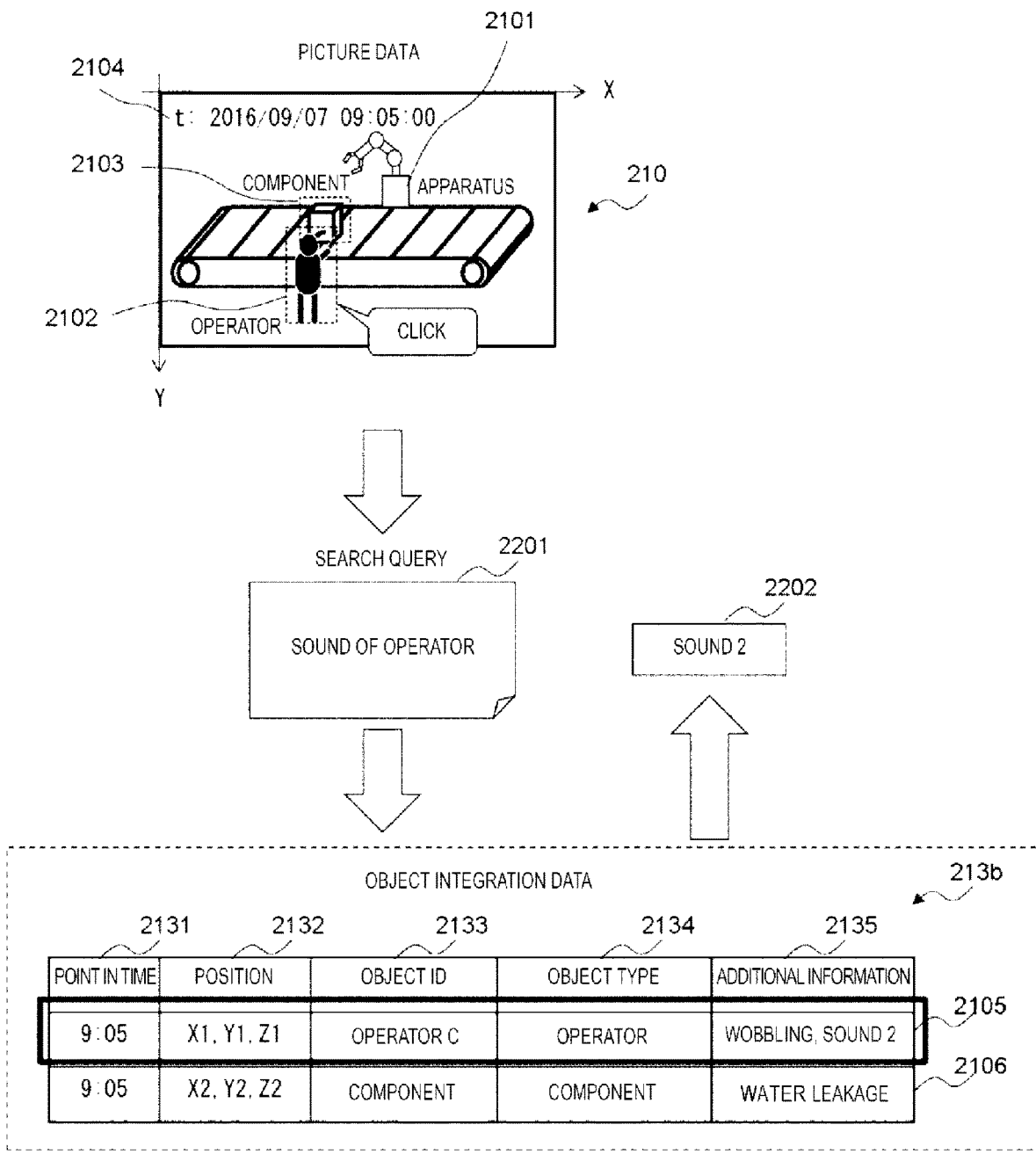
FIG. 34 is a diagram for describing an example of visualization processing according to the third embodiment.

FIG. 34 is a diagram for describing an example of the visualization processing according to the third embodiment. As illustrated in FIG. 34, the visualization unit 201 outputs the picture data 210 including each object image-captured, to the output device, and receives the assignment (input) of an object by the user with respect to the visualization unit 201. Then, the visualization unit 201 acquires an environment sensing information that satisfies an object which is assigned and a search query 2201 which is a condition that is set in advance, and outputs information 2202 that corresponds to the acquired environment sensing information.

For example, in a case where the user performs assigning of a certain operating person 2102 (hereinafter referred to as an assigned operating person in the present paragraph) on a screen of an output device to which the picture data 210 that is image-captured at a position (X1, Y1, Z1) in an actual space at point in time "9:05" is output, (for example, in a case where the assigning is performed on a touch panel screen), the visualization unit 201 specifies the record 2105 in which an object type of the assigned operating person is stored under the object type 2134, from the record in the object integration data 213b. Then, the visualization unit 201 acquires details ("wobbling", and "sound 2" that is environment sensing information) under the additional information 2135 in the specified record 2105, and converts the acquired environment sensing information "sound 2" into information 2202 (for example, voice) that corresponds to "sound 2" and outputs the information 2202 that results from the conversion to the manufacturing management server 108, the client node 106, or the like.

In this manner, the manufacturing management system 1 according to the present embodiment outputs information relating to the situation of the processing of the component, based on a plurality of pieces of processing situation information, such as the image data and the environment sensing information. Accordingly, the user, for example, can keep track of a component or product manufacturing processing. Accordingly, the traceability can be increased in the product manufacturing process.

Fourth Embodiment

Next, a manufacturing management system according to a fourth embodiment is described with reference to the drawings. In addition to the traceability information that is described in the first embodiment, the manufacturing management system according to the fourth embodiment uses the image data, which is described in the first embodiment, and the environment sensing information, which is described in the third embodiment, as pieces of processing situation information. Differences with the first embodiment and the second embodiment are described in a focused manner.

Apparatus Configuration

Figure 35:
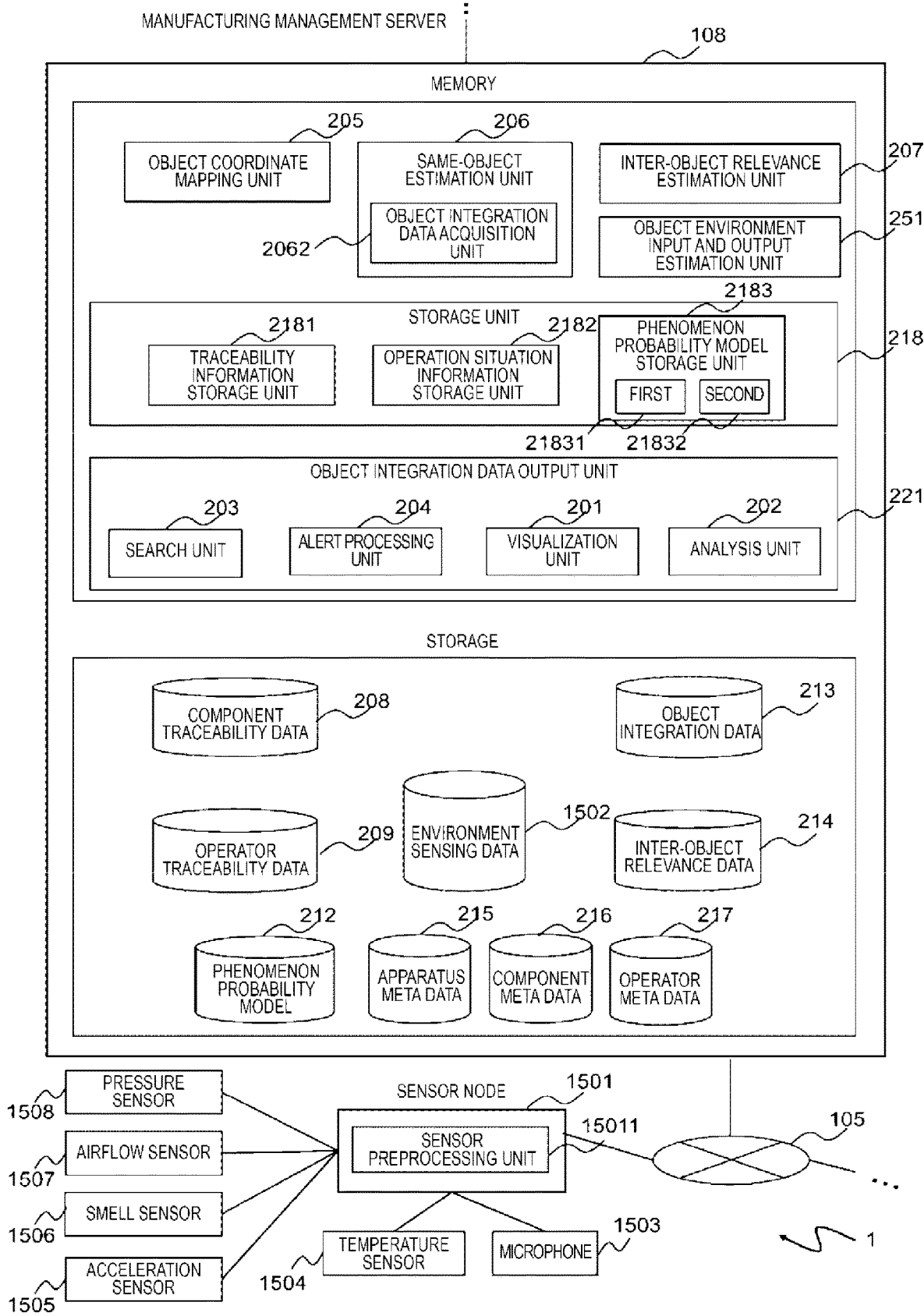
FIG. 35 is a diagram for describing an example of a configuration of a manufacturing management system according to a fourth embodiment.

FIG. 35 is a diagram for describing an example of a configuration of the manufacturing management system 1 according to the fourth embodiment. As illustrated in FIG. 35, the manufacturing management system 1 according to the present embodiment includes the sensor node 1501 and the sensor group according to the second embodiment. Furthermore, the manufacturing management system 1 includes the camera node 109 and the camera 112 according to the first embodiment as well. The other apparatuses are the same as those in the first embodiment.

Function

The manufacturing management server 108 according to the present embodiment stores the environment sensing data 1502 according to the second embodiment. The other pieces of data are the same as those in the first embodiment.

Furthermore, the manufacturing management server 108 according to the present embodiment includes the object environment input and output estimation unit 251 according to the second embodiment. It is noted that the other functions are the same as those in the first embodiment.

Same-Object Estimation Processing, Inter-Object Relevance Estimation Processing, and Environment Input and Output Estimation Processing Next, same-object estimation processing, inter-object relevance estimation processing, and environment input and output estimation processing according to the present embodiment are described.

FIG. 36 is a diagram for describing an example of the same-object estimation processing, the inter-object relevance estimation processing, and the environment input and output estimation processing according to the fourth embodiment. As illustrated in FIG. 36, with the same-object estimation processing and the inter-object relevance estimation processing, the object integration data 213 and the inter-object relevance data 214 are generated based on the new component traceability data 208a, the new operator traceability data 209a, and the new picture extraction data 211a. Next, with the environment input and output estimation processing, the object integration data 213 and the inter-object relevance data 214 to which the environment sensing information is appended are generated based on the object integration data 213 and the environment sensing data 1502, which are generated in the above description (the object integration data 213 and the inter-object relevance data 214 result from the update).

For example, as illustrated in FIG. 36, first, information indicating a situation of processing, referred to as "wobbling" which is interpreted based on the picture data 210 (the image data), is stored under the additional information 2135 in the record 2403 in the object integration data 213. Next, the environment sensing information, referred to as "sound 2", is appended to the additional information 2135 in the record 2403 in the object integration data 213 that is generated in the above description.

Furthermore, information indicating a situation of processing, referred to as "packing", which is interpreted based on the picture data 210 (the image data), is stored under the additional information 2144 in the record 2408 in the generated inter-object relevance data 214.

As described above, with a combination of the manufacturing management systems 1 according to the first to third embodiments, the manufacturing management system 1 according to the present embodiment can be configured.

The embodiments are described above for easy understanding of the invention, but this does not limit the invention. A change or an improvement to the invention can be made without departing from the nature of the invention, and equivalents thereof fall within the scope of the invention.

What is claimed is:

1. A manufacturing management method of managing a product that is manufactured by performing a plurality of processing operations on a component, implemented by an information processing apparatus comprising a processor and a memory, the method comprising:
   storing traceability information that is information which results from associating an apparatus that processes the component, an operating person who is in charge of the processing, and a timing at which the processing is performed, with each other;
   storing processing situation information that is information that results from associating a situation of the processing of the component and a timing at which the processing is performed, with each other;
   storing, in the information processing apparatus, a first phenomenon probability model that includes information relating to a probability that a combination of the operating person and the component on which the processing of which the operating person is in charge is performed will occur at the same timing;
   generating a combination at the same timing, of the processing, the apparatus or the operating person, and the situation of the processing, as an object integration data, based on the traceability information and the processing situation information, wherein the generating of the combination comprises generating the object integration data based on first phenomenon probability model; and
   outputting contents of the generated object integration data.

2. The manufacturing management method according to claim 1,
   wherein the traceability information is information that includes a position at which the processing of the component is performed and a position of the operating person who is in charge of the processing, and
   wherein the generating of the combination comprises generating a combination at the same timing and at the same place, of the processing, the apparatus or the operating person, and the situation of the processing, as the object integration data, based on the position at which the processing of the component is performed and the position of the operating person who is in charge of the processing.

3. The manufacturing management method according to claim 1,
   wherein the information processing apparatus is configured to acquire a plurality of the pieces of object integration data, and estimate relevance among the acquired pieces of object integration data, and
   wherein the outputting of the contents comprises outputting information indicating the estimated relevance.

4. The manufacturing management method according to claim 1,
   wherein the information processing apparatus is configured to store a second phenomenon probability model that includes information relating to a probability that a combination of a situation of the processing of the component and the operating person or the component will occur at the same timing, and
   wherein relevance among the pieces of object integration data is estimated based on the second phenomenon probability model.

5. The manufacturing management method according to claim 1,
   wherein the processing situation information includes information of an image that results from image-capturing a situation of the processing of the component.

6. The manufacturing management method according to claim 1,
   wherein the processing situation information includes information relating to any one of sound, temperature, smell, a speed of a person or a thing, a wind speed, and atmospheric pressure that occur in association with the processing of the component.

7. A manufacturing management method of managing a product that is manufactured by performing a plurality of processing operations on a component, implemented by an information processing apparatus comprising a processor and a memory, the method comprising:
   storing processing situation information that is information that results from associating a situation of the processing of the component and a timing at which the processing is performed, with each other, wherein the processing situation information includes information of an image that results from image-capturing a situation of the processing of the component and information relating to any one of sound, temperature, smell, a speed of a person or a thing, a wind speed, and atmospheric pressure that occur in association with the processing of the component;

storing traceability information that is information which results from associating an apparatus that processes the component, an operating person who is in charge of the processing, and a timing at which the processing is performed, with each other, wherein the traceability information is information that includes a position at which the processing of the component is performed, and a position of the operating person who is in charge of the processing;

wherein the information processing apparatus is further configured to store a first phenomenon probability model that is information relating to a probability that a combination of the operating person and the component on which processing in which the operating person is in charge is performed will occur at the same timing, acquire a plurality of the pieces of object integration data and estimates relevance among the acquired pieces of object integration data, store a second phenomenon probability model that is information relating to a probability that a combination of a situation of the processing of the component and the operating person or the component will occur at the same timing, and generate a combination at the same timing, of the processing, the apparatus or the operating person, and the situation of the processing, as object integration data, based on the traceability information and the processing situation information, wherein the generating of the combination further comprises generating the combination at the same timing and at the same place, of the processing, the apparatus or the operating person, and the situation of the processing, as the object integration data, based on a position at which the processing of the component is performed and a position of the operating person who is in charge of the processing, and generating the object integration data based on the first phenomenon, wherein relevance among the pieces of object integration data is estimated based on the second phenomenon probability model, wherein the method further comprises outputting contents of the generated object integration data, and wherein the outputting of the contents comprises information indicating the estimated relevance.

8. A manufacturing management system configured to manage a product which is manufactured by performing a plurality of processing operations on a component, the system including a processor and a memory comprising:

a traceability information storage unit configured to store traceability information that is information which results from associating an apparatus that processes the component, an operating person who is in charge of the processing, and a timing at which the processing is performed, with each other;

a processing situation information storage unit configured to store processing situation information that is information which results from associating a situation of the processing of the component and a timing at which the processing is performed, with each other;

a first phenomenon probability storage unit configured to store a first phenomenon probability model that is information relating to a probability that a combination of the operating person and the component on which the processing by the operating person is performed will occur at the same timing, an object integration data generation unit configured to generate a combination at the same timing, of the processing, the apparatus or the operating person, and the situation of the processing, as an object integration data, based on the traceability information and the processing situation information, wherein the object integration data generation unit is configured to generate the object integration data based on the first phenomenon probability model; and an object integration data output unit configured to output contents of the generated object integration data.

9. The manufacturing management system according to claim 8, wherein the traceability information is information that includes a position at which the processing of the component is performed and a position of the operating person who is in charge of the processing, and wherein the object integration data generation unit is configured to generate a combination at the same timing and at the same place, of the processing, the apparatus or the operating person, and the situation of the processing, as the object integration data, based on the position at which the processing of the component is performed and the position of the operating person who is in charge of the processing.

10. The manufacturing management system according to claim 8, further comprising:

an inter-object relevance estimation unit configured to acquire a plurality of the pieces of object integration data and estimates relevance among the acquired pieces of the object integration data, wherein the object integration data output unit is configured to output information indicating the estimated relevance.

11. The manufacturing management system according to claim 8, further comprising:

a second phenomenon probability model storage unit configured to store a second phenomenon probability model that is information relating to a probability that a combination of a situation of the processing of the component and the operating person or the component will occur at the same timing, and wherein the inter-object relevance estimation unit is configured to estimate relevance among the pieces of object integration data based on the second phenomenon probability mode.

12. The manufacturing management system according to claim 8, wherein the processing situation information includes information of an image that results from image-capturing a situation of the processing of the component.

13. The manufacturing management method according to claim 8, wherein the processing situation information includes information relating to any one of sound, temperature, smell, a speed of a person or a thing, a wind speed, and atmospheric pressure that occur in association with the processing of the component.

* * * * *